US012475681B2

(12) United States Patent
Nalam Venkat et al.

(10) Patent No.: US 12,475,681 B2
(45) Date of Patent: Nov. 18, 2025

(54) APPARATUS AND METHODS OF TRAINING MODELS OF DIAGNOSTIC ANALYZERS

(71) Applicant: Siemens Healthcare Diagnostics Inc., Tarrytown, NY (US)

(72) Inventors: Rayal Raj Prasad Nalam Venkat, Princeton, NJ (US); Benjamin S. Pollack, Jersey City, NJ (US); Yao-Jen Chang, Princeton, NJ (US); Venkatesh NarasimhaMurthy, Hillsborough, NJ (US); Vivek Singh, Princeton, NJ (US); Ankur Kapoor, Plainsboro, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 642 days.

(21) Appl. No.: 17/755,477

(22) PCT Filed: Oct. 22, 2020

(86) PCT No.: PCT/US2020/056932
§ 371 (c)(1),
(2) Date: Apr. 29, 2022

(87) PCT Pub. No.: WO2021/086725
PCT Pub. Date: May 6, 2021

(65) Prior Publication Data
US 2022/0383618 A1 Dec. 1, 2022

Related U.S. Application Data

(60) Provisional application No. 62/929,071, filed on Oct. 31, 2019.

(51) Int. Cl.
*G06V 10/00* (2022.01)
*G06V 10/56* (2022.01)
(Continued)

(52) U.S. Cl.
CPC ............ *G06V 10/764* (2022.01); *G06V 10/56* (2022.01); *G06V 10/774* (2022.01); *G06V 10/82* (2022.01);
(Continued)

(58) Field of Classification Search
CPC .... G06V 10/764; G06V 10/56; G06V 10/774; G06V 10/82; G06V 20/60;
(Continued)

(56) References Cited

U.S. PATENT DOCUMENTS 6,069,696 A    5/2000   McQueen et al.
8,891,862 B1  11/2014   Wolk et al.
(Continued)

FOREIGN PATENT DOCUMENTS

CN    106383853 A    2/2017
CN    108352339 A    7/2018
(Continued)

OTHER PUBLICATIONS

PCT International Search Report and Written Opinion dated Jan. 27, 2021 (9 Pages).
(Continued)

*Primary Examiner* — Md K Talukder

(57) ABSTRACT

A method of training a model of a diagnostic apparatus includes providing one or more first tube assemblies of a first type and one or more second tube assemblies of a second type in a diagnostic apparatus; capturing one or more first images of at least a portion of each of the one or more first tube assemblies and the second tube assemblies using the imaging device. Training the model includes identifying tube assemblies of the first type and tube assemblies of the second type based on the one or more first images and the one or more second images. Tubes assemblies of the first type are grouped into a first group and tube assemblies of the (Continued)

second type are grouped into a second group. Other methods and apparatus are disclosed.

20 Claims, 12 Drawing Sheets

(51) Int. Cl.
| | | |
|---|---|---|
| | *G06V 10/764* | (2022.01) |
| | *G06V 10/774* | (2022.01) |
| | *G06V 10/82* | (2022.01) |
| | *G06V 20/60* | (2022.01) |
| | *A61B 5/15* | (2006.01) |

(52) U.S. Cl.
CPC ........ G06V 20/60 (2022.01); *A61B 5/150343* (2013.01)

(58) Field of Classification Search
CPC .. A61B 5/150343; G06N 3/045; G06N 20/00; G06N 20/10; G06N 3/08; G16H 10/40; G01N 2035/00821; G01N 35/00732
See application file for complete search history.

(56) References Cited

U.S. PATENT DOCUMENTS

| | | | |
|---|---|---|---|
| 11,035,870 | B2 | 6/2021 | Kluckner et al. |
| 2007/0217951 | A1 | 9/2007 | Matsumoto |
| 2007/0254277 | A1* | 11/2007 | Scrabeck ............... G16H 10/40 702/19 |
| 2009/0324032 | A1 | 12/2009 | Chen |
| 2015/0064740 | A1 | 3/2015 | Nagai et al. |
| 2016/0018427 | A1 | 1/2016 | Streibl et al. |
| 2016/0311590 | A1 | 10/2016 | Wolfe |
| 2017/0036206 | A1* | 2/2017 | Furrer ................. B01L 3/50825 |
| 2017/0082555 | A1* | 3/2017 | He ......................... G06N 20/20 |
| 2017/0124704 | A1* | 5/2017 | Wu ........................ G06T 7/0012 |
| 2017/0127704 | A1* | 5/2017 | Simonsson ............... A23L 2/60 |
| 2018/0003706 | A1 | 1/2018 | Trenholm et al. |
| 2018/0033140 | A1 | 2/2018 | Wu et al. |
| 2018/0045654 | A1* | 2/2018 | Park ........................ G01N 21/03 |
| 2018/0122508 | A1* | 5/2018 | Wilde ................... G16H 50/20 |
| 2018/0211380 | A1* | 7/2018 | Tandon .................. G06V 20/69 |
| 2018/0243800 | A1* | 8/2018 | Kumar .................. G06N 20/00 |
| 2018/0365530 | A1 | 12/2018 | Kluckner et al. |
| 2018/0372648 | A1 | 12/2018 | Wissmann et al. |
| 2019/0033209 | A1 | 1/2019 | Kluckner et al. |
| 2019/0234841 | A1 | 8/2019 | Spencer et al. |
| 2019/0271714 | A1* | 9/2019 | Kluckner ............... G01N 21/63 |
| 2020/0158745 | A1* | 5/2020 | Tian ...................... G06V 10/454 |
| 2021/0311011 | A1* | 10/2021 | Overcash ........... G06Q 30/0185 |
| 2022/0383618 | A1* | 12/2022 | Nalam Venkat ....... G06V 10/82 |
| 2022/0398846 | A1* | 12/2022 | Nalam Venkat ........................... G01N 35/00732 |
| 2023/0230399 | A1* | 7/2023 | von Einem ............ G06V 20/52 382/134 |
| 2024/0374289 | A1* | 11/2024 | Bachar ................. A61B 17/435 |

FOREIGN PATENT DOCUMENTS

| | | |
|---|---|---|
| CN | 109477848 A | 3/2019 |
| CN | 109886302 A | 6/2019 |
| CN | 209877896 U | 12/2019 |
| JP | S60-4860 A | 1/1985 |
| JP | 2005182143 A | 7/2005 |
| JP | 2009-204360 A | 9/2009 |
| JP | 2009545032 A | 12/2009 |
| JP | 2011247635 A | 12/2011 |
| JP | 2012-024042 A | 2/2012 |
| JP | 2014-513311 A | 5/2014 |
| JP | 2014194729 A | 10/2014 |
| WO | 2017132167 A1 | 8/2017 |
| WO | 2017163117 A1 | 9/2017 |
| WO | 2018022280 A1 | 2/2018 |
| WO | 2019/013960 A1 | 1/2019 |

OTHER PUBLICATIONS

"Support vector machine." Wikipedia, Wikimedia Foundation, last modified on Mar. 28, 2022, accessed [Apr. 28, 2022] <https://en.wikipedia.org/wiki/Support_vector_machine#Linear_SVM> .
"Notice of change in the test contents for fecal calprotection", [online], Jan. 2018, Q-Lin Co., Ltd., <URL:https://kyurin.co.jp/info/18 · 001a_2.pdf>.

* cited by examiner

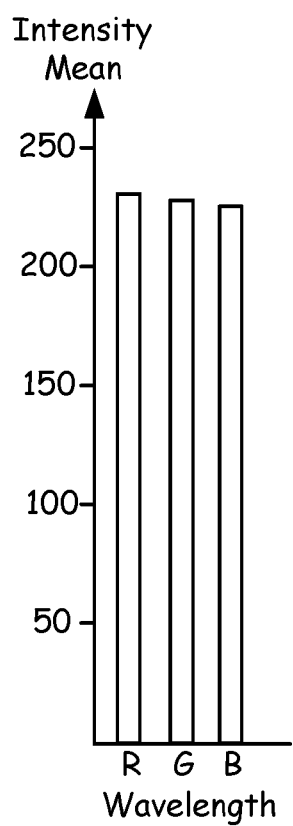
*FIG. 11A*
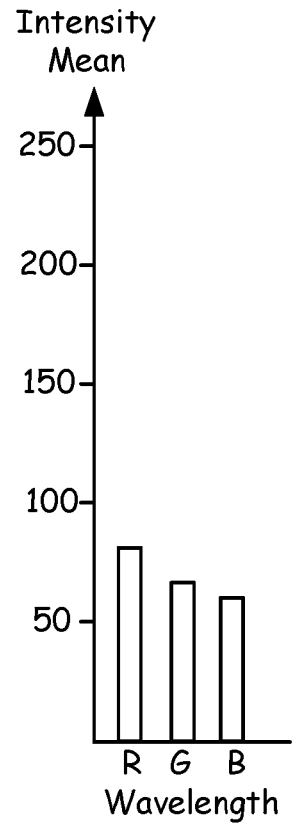
*FIG. 11B*
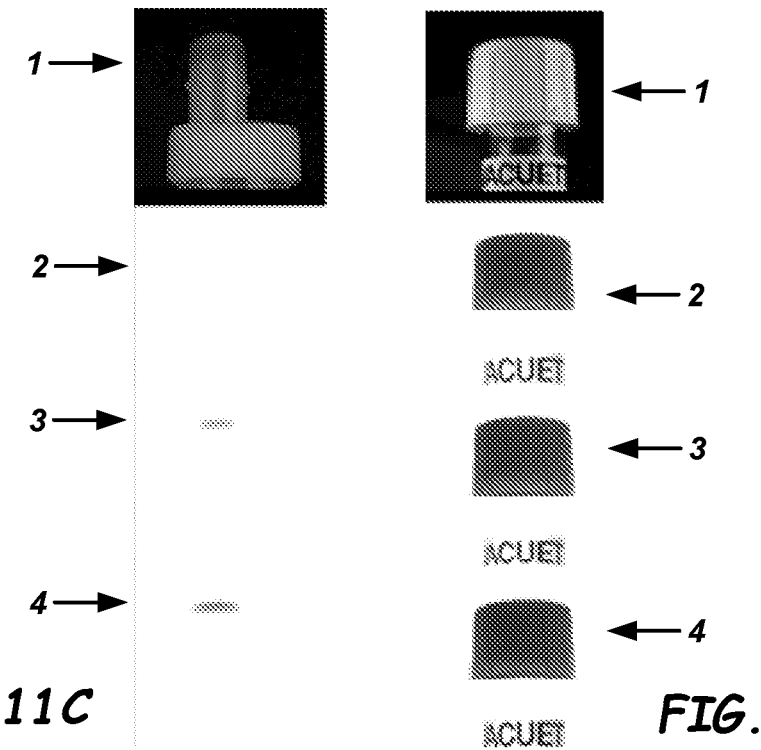
*FIG. 11C*
*FIG. 11D*

| Tube | First Cap Standard | Second Cap Standard | Third Cap Standard |
|---|---|---|---|
| First Tube Type | Tan / Clear | Dark Red | Gray |
| Second Tube Type | Tan / Orange | Tan / Orange | Tan / Orange |
| Third Tube Type | Red / Green | Red | Green |

FIG. 12

APPARATUS AND METHODS OF TRAINING MODELS OF DIAGNOSTIC ANALYZERS

CROSS REFERENCE TO RELATED APPLICATION APPLICATIONS

This disclosure is a 371 of PCT/US2020/056932, filed Oct. 22, 2020, which claims the benefit of U.S. Provisional Patent Application No. 62/929,071, entitled "APPARATUS AND METHODS OF IDENTIFYING TUBE ASSEMBLIES," filed Oct. 31, 2019, the disclosures of which are hereby incorporated by reference in their entireties for all purposes herein.

FIELD

Embodiments of the present disclosure relate to apparatus and methods of identifying tube assemblies.

BACKGROUND

Automated testing systems may conduct clinical chemistry or assays using one or more reagents to identify an analyte or other constituent in a biological sample (sample) such as blood serum, blood plasma, urine, interstitial liquid, cerebrospinal liquids, and the like. For convenience and safety reasons, these samples are almost always contained in sample tubes (e.g., blood collection tubes). The sample tubes may be capped, and in some cases, the caps may include a color and/or shape that provides information concerning the type of test to be conducted, type of additive contained in the tube (e.g., serum separator, coagulant such as thrombin, or anticoagulant and specific type thereof, like EDTA or sodium citrate, or anti-glycosis additive), whether the tube is provided with vacuum capability, and the like.

In certain automated testing systems, the sample container and sample are digitally imaged and processed, such as with a computer-aided digital imaging system, so that type and color of the cap can be discerned. During imaging, one or more images of the sample tube (including the cap) and sample can be captured.

However, such systems may, under certain conditions, provide variations in performance and could possibly improperly characterize a tube type. Thus, improved methods and apparatus of characterizing sample tubes via digital imaging and processing are sought.

SUMMARY

According to a first embodiment, a method of training a model of a diagnostic apparatus is provided. The method includes: providing one or more first tube assemblies of a first type in a diagnostic apparatus; providing one or more second tube assemblies of a second type in the diagnostic apparatus; capturing one or more first images of at least a portion of each of the one or more first tube assemblies using an imaging device; capturing one or more second images of at least a portion of each of the one or more second tube assemblies using the imaging device; training a model to identify tube assemblies of the first type and tube assemblies of the second type based on the one or more first images and the one or more second images; grouping tube assemblies of the first type into a first group; and grouping tube assemblies of the second type into a second group.

According to a second embodiment, a method of operating a diagnostic apparatus is provided. The method includes training a model of a diagnostic apparatus, including: training a model of a diagnostic apparatus, comprising: providing one or more first tube assemblies of a first type in a diagnostic apparatus; providing one or more second tube assemblies of a second type in the diagnostic apparatus; capturing one or more first images of at least a portion of each of the one or more first tube assemblies using an imaging device; capturing one or more second images of at least a portion of each of the one or more second tube assemblies using the imaging device; and training the model to identify tube assemblies of the first type and tube assemblies of the second type based on the one or more first images and the one or more second images. The method further includes: grouping tube assemblies of the first type into a first group; grouping tube assemblies of the second type into a second group; loading one or more tube assemblies containing specimens located therein into the diagnostic apparatus; imaging the one or more tube assemblies containing specimens; identifying the one or more tube assemblies containing specimens as being of the first type or the second type using the model; and grouping the one or more tube assemblies containing specimens into the first group or the second group based on the identifying.

According to a third embodiment, a diagnostic apparatus is provided. The apparatus includes: a location configured to store one or more first tube assemblies of a first type and one or more second tube assemblies of a second type; an imaging device configured to image at least a portion of the one or more first tube assemblies and at least a portion of the one or more second tube assemblies; a transport device configured to transport the one or more first tube assemblies and the one or more second tube assemblies at least to the imaging device; a controller including a processor coupled to a memory, the memory having instructions stored therein that, when executed by the processor: train a model to identify tube assemblies of the first type and tube assemblies of the second type; and group tube assemblies of the first type in a first group and tube assemblies of the second type in a second group.

Still other aspects, features, and advantages of the present disclosure may be readily apparent from the following description which illustrates a number of example embodiments and implementations. The present disclosure may also be capable of other and different embodiments, and its several details may be modified in various respects, all without departing from the scope thereof. Accordingly, the drawings and descriptions are to be regarded as illustrative in nature, and not as restrictive. The disclosure is to cover all modifications, equivalents, and alternatives falling within the scope of the claims.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the disclosure in any way. Like numerals are used throughout to denote the same or similar elements.

FIG. 11A illustrates a bar graph of example light spectrums (e.g., R, G, B) passing through a first tube assembly and captured by an imaging device according to one or more embodiments.

FIG. 11B illustrates a graph of example light spectrums (e.g., R, G, B) passing through a second tube assembly and captured by an imaging device according to one or more embodiments.

FIG. 11C illustrates a photographic image of a portion of a back-illuminated, first tube assembly that yielded the graph of FIG. 11A according to one or more embodiments.

FIG. 11D illustrates photographic images of a portion of a back-illuminated, second tube assembly that yielded the graph of FIG. 11B according to one or more embodiments.

FIG. 12 illustrates different color combinations of caps used for the same and/or different tube types per different standards.

DETAILED DESCRIPTION

Figure 1:
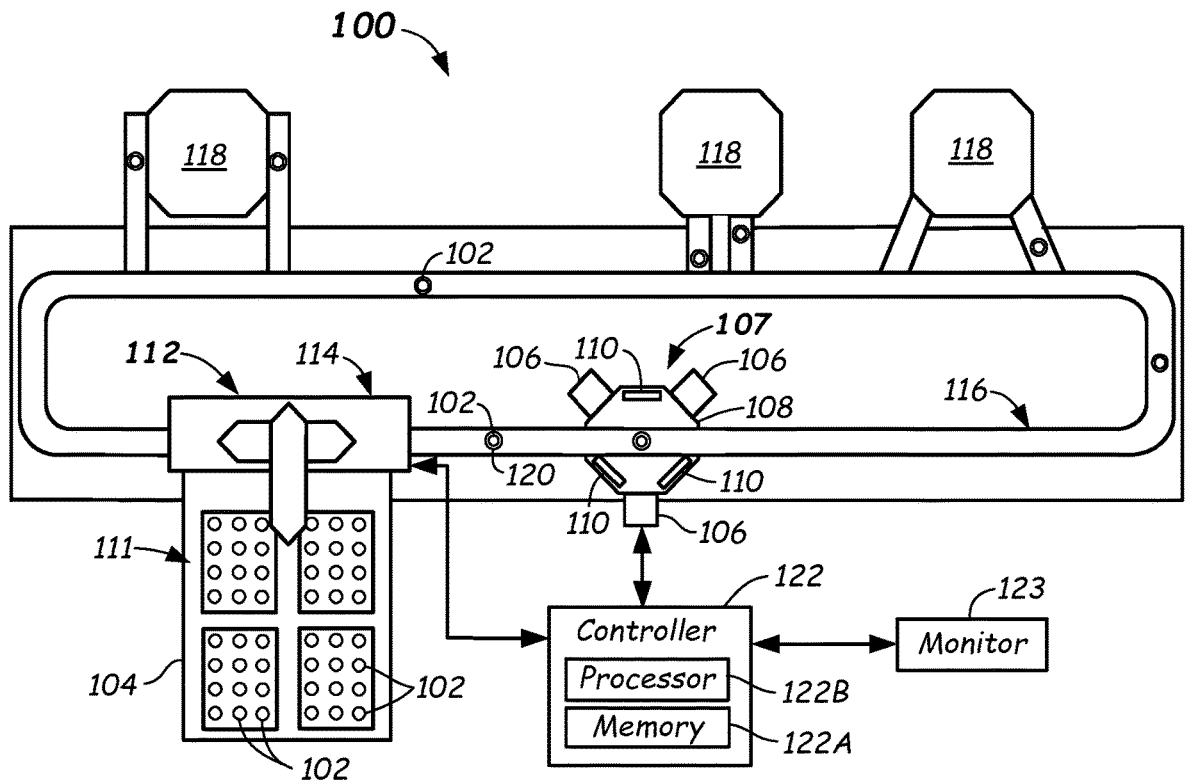
FIG. 1 is a top view schematic diagram of a diagnostic apparatus configured to identify and group tube assemblies according to one or more embodiments.

Diagnostic labs may use test tubes (e.g., tube assemblies) from various manufacturers to contain specimens in which it is desired to perform one or more tests. A tube assembly may include a tube, such as a closed-bottomed tube with a cap attached thereto. Different tube assembly types (e.g., tube types) may have different characteristics, such as different sizes and different chemical additives therein. For example, many tube types are chemically active, meaning the tubes contain one or more additive chemicals therein that are used to change or retain a state of the specimen or otherwise assist in its processing. For example, the inside wall of a tube may be coated with the one or more additives or an additive may be provided elsewhere in the tube. For example, the type of additive contained in the tube may be a serum separator, coagulant such as thrombin, anticoagulant like EDTA or sodium citrate, an anti-glycosis additive, or other additive for changing or retaining a characteristic of the specimen. The tube assembly manufacturers may associate the color of the cap on a tube with a specific type of chemical additive contained in the tube.

Different manufacturers may have their own standards for associating features of the tube assemblies, such as cap color and cap shape, with particular properties of the tube assemblies. For example, the features may be related to the contents of the tubes or possibly whether the tube are provided with vacuum capability. In some embodiments, a manufacturer may associate all tube assemblies with gray colored caps with tubes including potassium oxalate and sodium fluorate configured to test glucose and lactate, green colored caps including heparin for stat electrolytes such as sodium, potassium, chloride, and bicarbonate, for example. Caps with lavender color may identify tubes containing EDTA (Ethylenediaminetetraacetic Acid—an anticoagulant) configured to test CBC w/diff., HgBA1c, and parathyroid hormone. Other cap colors such as red, yellow, light blue, royal blue, pink, orange, and black may be used to signify other additives or lack of an additive. In further embodiments, combinations of colors of the caps may be used, such as yellow and lavender for a combination of EDTA and gel separator, or green and yellow for lithium heparin and gel separator.

The laboratories may use this color information for further processing of the tubes. Since these tubes may be chemically active (usually lined with substances like coagulants, anticoagulants, or anti-glycolytic compounds), it becomes important to associate which tests can be run on which tube types because tests are almost always content-specific. Thus, the laboratories may confirm that tests being run on specimens in the tubes are the correct tests by analyzing the colors of the caps.

These manufacturer-dependent standards themselves may vary from region to region. For example, a manufacturer may use a first cap color for a tube type in Europe and a second cap color for the same tube type in the United States. Since the standards are not consistent, it is currently impossible for diagnostic apparatus to automatically determine the chemical contents of tubes based on the cap colors alone. As described above, labs use the tube type information to further testing of specimens within the tubes. Because the tube types may be chemically active, it is necessary to know which tests can be run on which tube assemblies.

Reference is made to FIG. 12, which illustrates examples of different cap standards that may be used for similar tube types. As shown in FIG. 12, some of the different cap standards may use similar cap types and/or cap colors with different tube types. Current workflows in labs expect lab technicians to be extremely familiar with these tube type standards. Because the diagnostic apparatus used on-site in the labs are unaware of these standards, manual entry for every single tube assembly is preformed to describe the contents of the tube and the functionality desired by the lab technician. As new tube types, new tube type standards, and tube assemblies from new or existing manufactures are used in the laboratories, the lab technicians need to become familiar with the new tube types and standards.

The methods and apparatus disclosed herein alleviate the effort of manually entering information for each tube assembly by providing a process for lab technicians to train one or more models (e.g., machine learning models) on the different tube types. During specimen testing, the trained model can classify different types of tube assemblies in real-time. The methods and apparatus also enable the transfer of machine learning models between laboratories and/or diagnostic apparatus.

Training a model may be performed by a user of the diagnostic apparatus. The user may obtain tube assemblies used for the same tests and may place these tube assemblies in the diagnostic apparatus. For example, the user may load a first plurality of tube assemblies that are of a first tube type into the diagnostic analyzer. The diagnostic analyzer may then capture images of the first plurality of tube assemblies in, which are then used to train the model. A second plurality of tube assemblies of a second tube type may also be imaged in a similar by the diagnostic analyzer to further train the model. The models and/or the diagnostic analyzer may perform operations of grouping tube assemblies of the first type into a first group and tube assemblies of the second type into the second group. The tubes assemblies in the first group may be associated with specific tests performed by the diagnostic analyzer and tube assemblies in the second group may be associated with different tests.

In some embodiments, one or more colors of the caps are extracted or identified from the images and annotated to assist users in training the models to identify and/or classify specific tube types. In other embodiments, other information from images of the tube assemblies, such as tube height and/or tube diameter, tube material (translucent or transparent), cap material, cap opacity or cap translucence, cap shape, cap dimensions, cap dimensional gradients, cap weight, and the like may be used to train the models. Such other information may be obtained directly from the image or otherwise annotated by an operator training the model.

The testing methods and apparatus disclosed herein may use artificial intelligence, i.e., one or more trained models (e.g., classification or discriminative models) such as neural networks (e.g., convolutional neural networks—CNNs), to identify and classify tube assemblies by tube type. Deep learning may be used to train the specific model to identify and classify the tube assemblies. Certain physical characteristics of the tubes and/or physical characteristics and colors of the caps attached thereto may be identified by the trained model in order to identify tube types of the various tube assemblies.

The apparatus and methods described herein enable diagnostic labs to differentiate every tube type that is used by the diagnostic analyzer, which has advantages over prior apparatus and methods. The methods and apparatus disclosed herein may reduce the time spent by an operator manually entering tube assembly information. No unified model for every possible tube type and/or tube assembly may be necessary because the operator can train models for only the tube types used in the laboratory and/or the analyzer, which may be only a small subset of all possible tube types. Time may be saved on training the model on-site because training can easily be done off-site at training sites, which may be or include diagnostic analyzers. The models that are trained off-site can be ported (e.g., downloaded) to new diagnostic apparatus on setup. The diagnostic apparatus using the trained model may perform tube content/functionality determinations in real-time, so a lot of redundant manually entered information can be automatically inferred based on the previously trained model(s).

In some embodiments, the methods and apparatus disclosed herein enable users of diagnostic apparatus to define their own classifications of tube assemblies that may be used to customize the functionality of the tube assemblies to the requirements of the labs. For example, the training methods and apparatus disclosed herein may enable users to differentiate tube types and to create classifications or groups of tube assemblies based on tube types, additives, and/or tube functionality unique to a diagnostic analyzer or laboratory.

The above-described methods and apparatus are described in further detail with respect to FIGS. 1-16 herein.

Reference is now made to FIG. 1, which illustrates a top schematic view of an embodiment of a diagnostic apparatus 100. The diagnostic apparatus 100 may be configured to perform one or more tests (assays and/or chemistry tests) on specimens located in tube assemblies 102. The tube assemblies 102 may be stored, input, and possibly output at a location 104 within the diagnostic apparatus 100. In the embodiment depicted in FIG. 1, the location 104 may include a container or other implement holding a plurality of trays 111, wherein each tray 111 may hold one or more tube assemblies 102.

One or more imaging devices 106 may be located in a vision system 107 located in, adjacent to, or coupled to the diagnostic apparatus 100 and may be configured to image the tube assemblies 102. In some embodiments, the one or more imaging devices 106 may be located within or as part of an imaging module 108. In the embodiment depicted in FIG. 1, a top of the imaging module 108 is removed to illustrate components located within the imaging module 108. One or more light sources 110 may be located in the imaging module 108 and may be configured to back-illuminate and/or front illuminate the tube assemblies 102 as described herein.

The diagnostic apparatus 100 may include a transport device 112 that may be configured to transport the tube assemblies 102 between at least the location 104 and the one or more imaging devices 106 and further to one or more analyzer modules 118. The transport device 112 may include a robot 114 and a conveyor or track 116, wherein the robot 114 is configured to move the tube assemblies 102 between the location 104, i.e., from one of the trays 111, and the track 116. The track 116 may be configured to transport the tube assemblies 102 at least between the location 104 and the vision system 107 for pre-screening thereof.

The diagnostic apparatus 100 may include one or more analyzer modules 118 (e.g., diagnostic analyzers or immunoassay instruments or the like) configured to perform clinical chemistry testing or assays on the samples in the tube assemblies 102, wherein the tube assemblies 102 may access the one or more analyzer modules 118 by way of the track 116. In some embodiments, the tube assemblies 102 are placed in carriers 120 (e.g. pucks) to facilitate movement of the tube assemblies 102 on the track 116. Other suitable carriers may be used, such as linear motor devices that are programmed to stop at desired locations about the track 116.

The diagnostic apparatus 100 may include a controller 122 coupled to at least the robot 114, the track 116, the carriers 120, the one or more imaging devices 106, and the one or more light sources 110. The controller 122 may be configured to receive data from at least the robot 114 and the one or more imaging devices 106. The controller 122 may also be configured to send commands to at least the robot 114, the one or more imaging device 106, and the one or more light sources 110. A memory 122A may include instructions stored therein that, when executed by a processor 122B, can be used to train one or more models to identify various tube assemblies of various types as described herein. The models may be trained to identify tube assemblies 102 of other types. The programmed instructions may also instruct the controller 122 to classify tube assemblies 102 of various types into various groups.

Figure 2A:
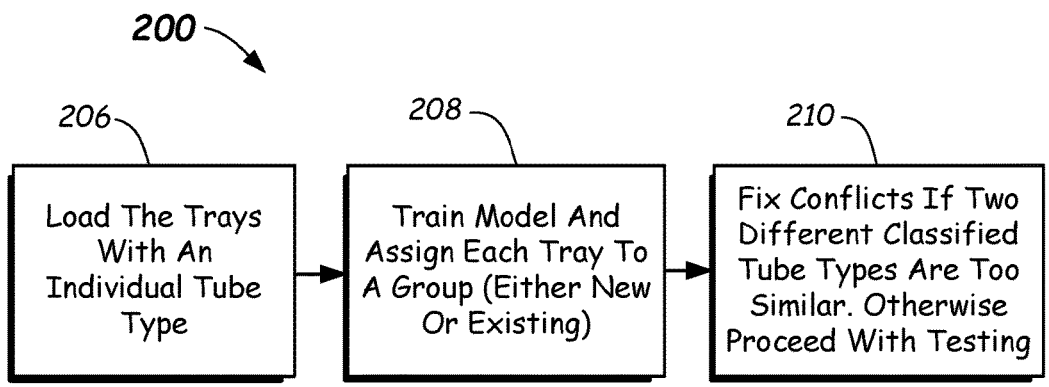
FIG. 2A illustrates a flowchart showing a method of training a diagnostic apparatus to classify tube assemblies by tube type according to one or more embodiments.
Figure 2B:
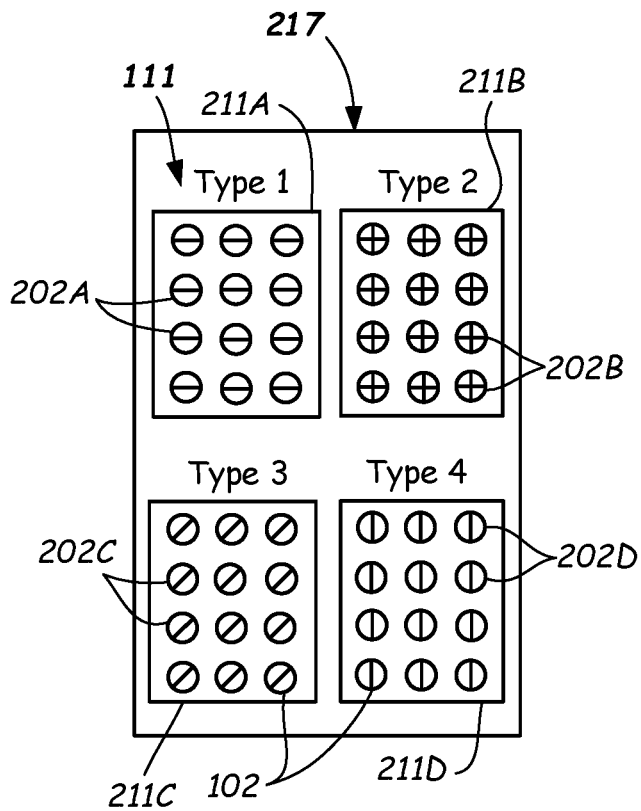
FIGS. 2B-2C illustrate tube assemblies located in trays in a diagnostic apparatus, wherein the diagnostic apparatus is configured to classify the tube assemblies by tube type according to one or more embodiments.
Figure 2C:
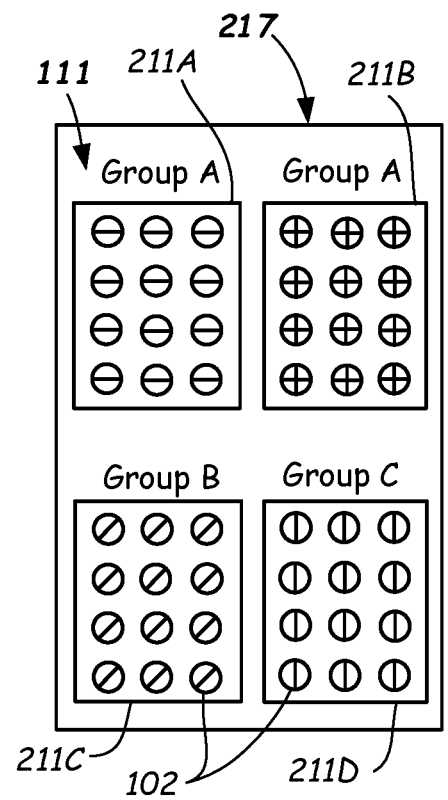

Additional reference is made to FIG. 2A, which illustrates a flowchart showing an embodiment of a method 200 of training a model used by the diagnostic apparatus 100 (FIG. 1). Reference is also made to FIGS. 2B-2C, which illustrate portions of embodiments of the diagnostic apparatus 100 as the model is undergoing different stages of training. In the embodiment depicted in FIGS. 2B-2C, the tube assemblies 102 are located in a plurality of trays 111 in the diagnostic apparatus 100. In the embodiment of the diagnostic apparatus 100, the location 104 (FIG. 1) may include a drawer 217 (e.g., a location) in which the plurality of the trays 111 are located. In some embodiments, the diagnostic apparatus 100 may include a plurality of drawers and each of the plurality of drawers may hold one or a plurality of trays 111 or containers. The trays 111 described herein may be used to isolate tube assemblies of the same tube type together during training of the model. In the embodiment of FIGS. 2B-2C, the drawer 217 includes four trays 111 that are referred to individually as the first tray 211A (e.g., a first container), the second tray 211B (e.g., a second container), the third tray 211C (e.g., a third container), and the fourth tray 211D (e.g., a fourth container). Other devices may be used by or in the diagnostic apparatus 100 to isolate similar tube assemblies.

In the embodiments described herein, the diagnostic apparatus 100 adapted for training the model has four types of tube assemblies 102 (tube types) located therein, with one tube type loaded in each of the trays 111 during training. The loading may be performed manually by a lab operator, for example. Other numbers of trays 111 and tube types may be used. The individual types of tube assemblies 102 may have the same or very similar physical characteristics. For example, similar (e.g., even identical) tube types may be from the same manufacturer and may have the same cap color and/or dimensions or other characteristics such as height, width, and/or weight.

In some embodiments different tube types may be configured to perform the same function, such as an anticoagulant function, coagulant function, or other function. For example, a first manufacturer may supply a first tube type having red caps that contain a particular chemical additive and that are configured for use in a first type of test. A second manufacturer may supply a second tube type having a different color (e.g., blue caps) that contain the same chemical additive as the first tube type and that are configured for use in the first type of test. In some embodiments, the methods and apparatus disclosed herein may train the model in the diagnostic apparatus 100 to classify together or group together (in software) the first tube type and the second tube type because they include the same chemicals used in the first type of test.

Various identifying characteristics of the different tube assembly types may be used to classify the different tube assembly types to train the model in block 208. For example, the identifying characteristics may include specific combinations of cap color or cap color combinations of two or more colors, cap shape, cap material, cap opacity or translucence, cap weight, cap dimensions or gradients of one or more dimensions, tube height, tube diameter, tube material, and the like. In some embodiments, a tube type may be defined solely by cap color or combinations of cap colors (e.g., gray and red).

In the embodiments disclosed in FIGS. 2B-2C, there are four tube assembly types (tube types) shown, which are referred to individually as first tube types 202A, second tube types 202B, third tube types 202C, and fourth tube types 202D. The first tube types 202A are referenced by horizontal lines, as shown. The second tube types 202B are referenced by crossed lines, as shown. The third tube types 202C are referenced by slanted lines, as shown. The fourth tube types 202D are referenced by vertical lines, as shown. Fewer or more tube types may be used.

Figure 3A:
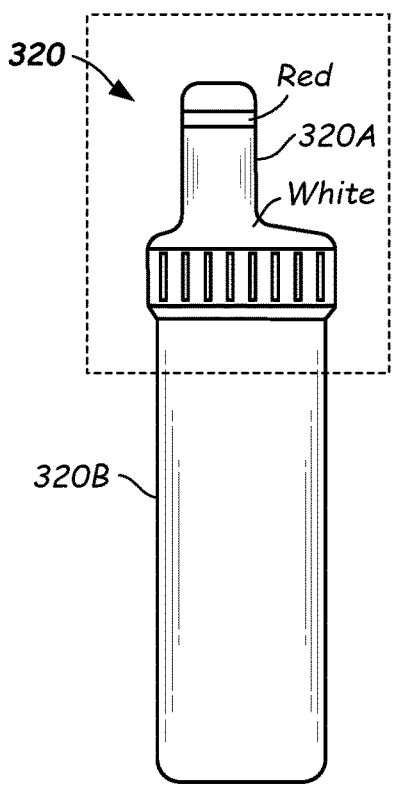
FIGS. 3A-3D illustrate examples of different types of tube assemblies according to one or more embodiments.
Figure 3B:
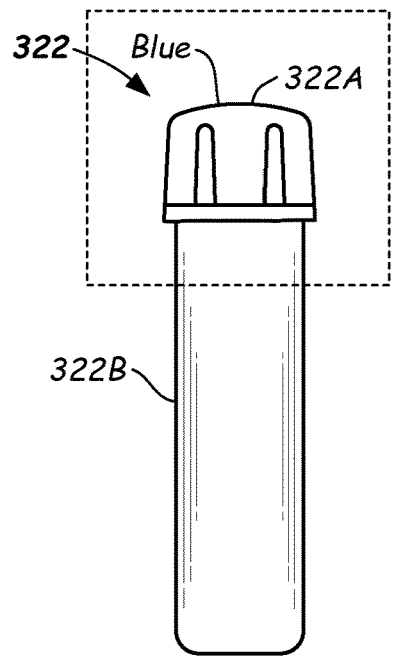
Figure 3C:
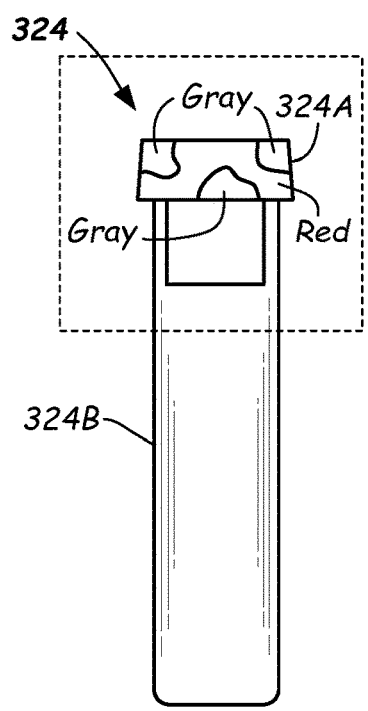
Figure 3D:
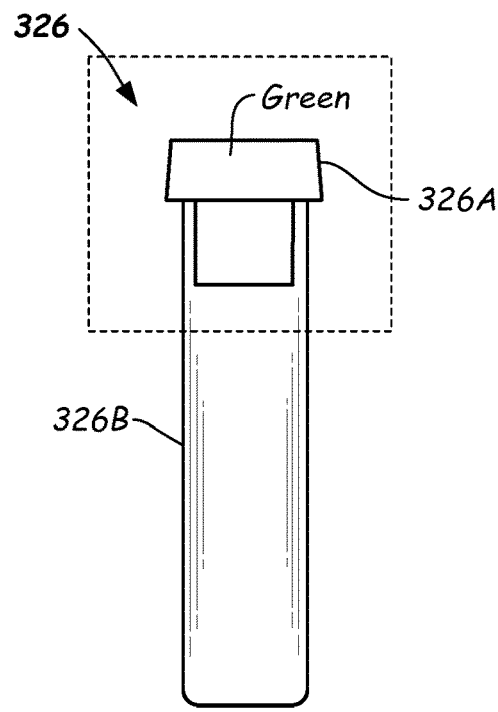

Additional reference is made to FIGS. 3A-3D, which illustrate elevation views of embodiments of different tube assemblies (tube types). FIG. 3A illustrates an elevation view of a first tube assembly 320 of the first tube type 202A. FIG. 3B illustrates an elevation view of a second tube assembly 322 of the second tube type 202B. FIG. 3C illustrates an elevation view of a third tube assembly 324 of the third tube type 202C. FIG. 3D illustrates an elevation view of a fourth tube assembly 326 of the fourth tube type 202D. The first tube assembly 320 may include a first cap 320A and a first tube 320B. The second tube assembly 322 may include a second cap 322A and a second tube 322B. The third tube assembly 324 may include a third cap 324A and a third tube 324B. The fourth tube assembly 326 may include a fourth cap 326A and a fourth tube 326B.

The first tube assembly 320 may be provided from a first manufacturer, the second tube assembly 322 may be provided from a second manufacturer, the third tube assembly 324 may be provided from a third manufacturer, and the fourth tube assembly 326 may be provided by a fourth manufacturer, for example. In some embodiments, all or some of the tube assemblies 320-326 may be provided from the same manufacturer. The first tube assembly 320 and the second tube assembly 322 may be configured to be used with the same types of tests. The third tube assembly 324 and the fourth tube assembly 326 may be configured to be used with different types of tests. As shown in FIGS. 3A-3C, the first cap 320A, the second cap 322A, and the third cap 324A have different geometric characteristics and the caps 320A-326A may have different cap colors or even combinations of different cap colors. In addition, some tube types may be different in terms of height and/or width. For example, the second tube 322B is shorter than the first tube 320B and the first tube 320B is wider than the other tubes.

An operator or user of the diagnostic apparatus 100 may commence the training method 200 as described in block 206 and shown in FIG. 2A by loading multiple instances of the same tube types into individual ones of the trays 111. For example, the operator may load each of the trays 111 with individual tube types. In some embodiments, a few instances (copies) of the same tube type may be provided in each of the trays 111 for training to account for variations between tube assemblies, such as manufacturing tolerances. This process results in a very strict tube type model(s) being trained for each tube type.

In the embodiment of FIG. 2B, first tube types 202A are loaded into the first tray 211A, second tube types 202B are loaded into the second tray 211B, third tube types 202C are loaded into the third tray 211C, and fourth tube types 202D are loaded into the fourth tray 211D.

After the tube assemblies 102 are loaded into the appropriate trays 211A-211D, the transport device 112 (FIG. 1) may transport the tube assemblies 102 to the vision system 107 to train the model per block 208. For example, the robot 114 may move the tube assemblies 102 to the track 116 where the tube assemblies 102 are transported to the one or more imaging devices 106 of the vision system 107 that may capture images of the tube assemblies 102 in response to a command from the controller 122. The captured images may be pixilated images, wherein each pixilated image may include a plurality of pixels. After the images are captured, the transport device 112 may then return the tube assemblies 102 back to the trays 111.

In some embodiments, the tube assemblies 102 are sent one-by-one to the vision system 107 and imaged. For example, each tube assembly 102 may be placed in a transport device or carrier 120 (e.g., a puck) and transported to the vision system 107. An algorithm may analyze each image, as described below. Using previously acquired reference images (e.g., an empty carrier 120 without a tube assembly located therein) and the image of the tube assembly 102 in the same carrier slot or receptacle (e.g., puck slot or receptacle), background subtraction may be performed to obtain a binary mask, which is used to highlight the pixels in the image that correspond to a tube assembly 102.

Figure 4A:
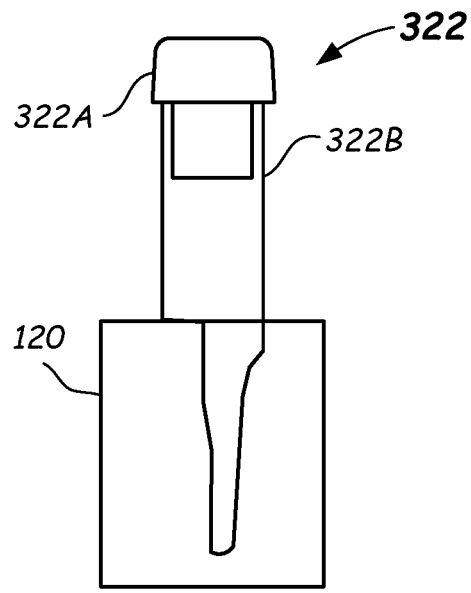
FIG. 4A illustrates an example from one camera of an original image of a tube assembly located in a puck slot wherein the puck obscures portions of the image of the tube assembly according to one or more embodiments.
Figures 4B, 5:
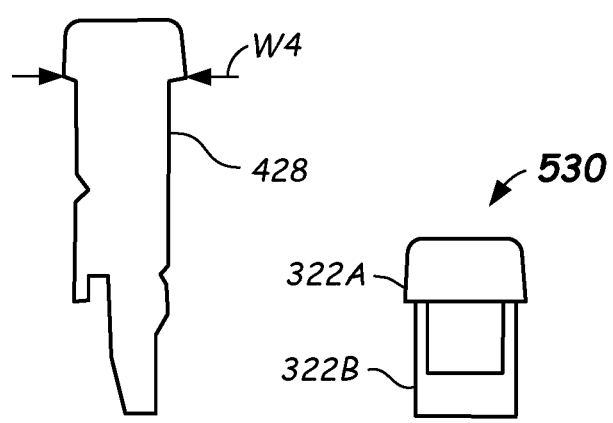
FIG. 4B illustrates a binary mask corresponding to the image of FIG. 4A according to one or more embodiments.
FIG. 5 illustrates a cap patch extracted from the image using the binary mask of FIG. 4B according to one or more embodiments.

FIG. 4A illustrates an example from one imaging device (other embodiments may use other numbers of imaging devices such as three cameras) of an original image of the second tube assembly 322 located in a puck slot wherein the puck (e.g., carrier 120—FIG. 1) obscures some lower portions of the image of the second tube 322B. FIG. 4B illustrates a binary mask 428 corresponding to the image of FIG. 4A. The binary mask 428 may include some outlying noise, which may be filtered out later.

A binary mask 428 of each tube type may be analyzed to determine which part of the tube assemblies correspond to the caps. The top portion of the binary mask corresponds to the top-most pixels of the cap (caps 320A-326A—depending on tube type), and the bottom-most pixels may be computed by inferring at which point of the mask the width is maximum after applying morphological post-processing to highlight the cap region and using connected components to remove noise. For example, the widest portion W4 of the image or mask may be the bottom of the cap. FIG. 5 illustrates an example of a resulting cap patch 530 (with some buffer, which may be a top portion of the second tube 322B) extracted using the binary mask 428. Generating the cap patch 530 may involve the algorithm identifying the widest portion W4 of the binary mask 428 and assigning pixels above the widest portion W4 as being the second cap 322A. Pixels including the widest portion W4 and some pixels below the widest portion W4 may also be assigned as being the second cap 322A. The pixels below the second cap 322A may be referred to as the buffer. In some embodiments, the cap patch 530 of FIG. 5 may be a cropped portion of the image of FIG. 4A.

Figure 13:
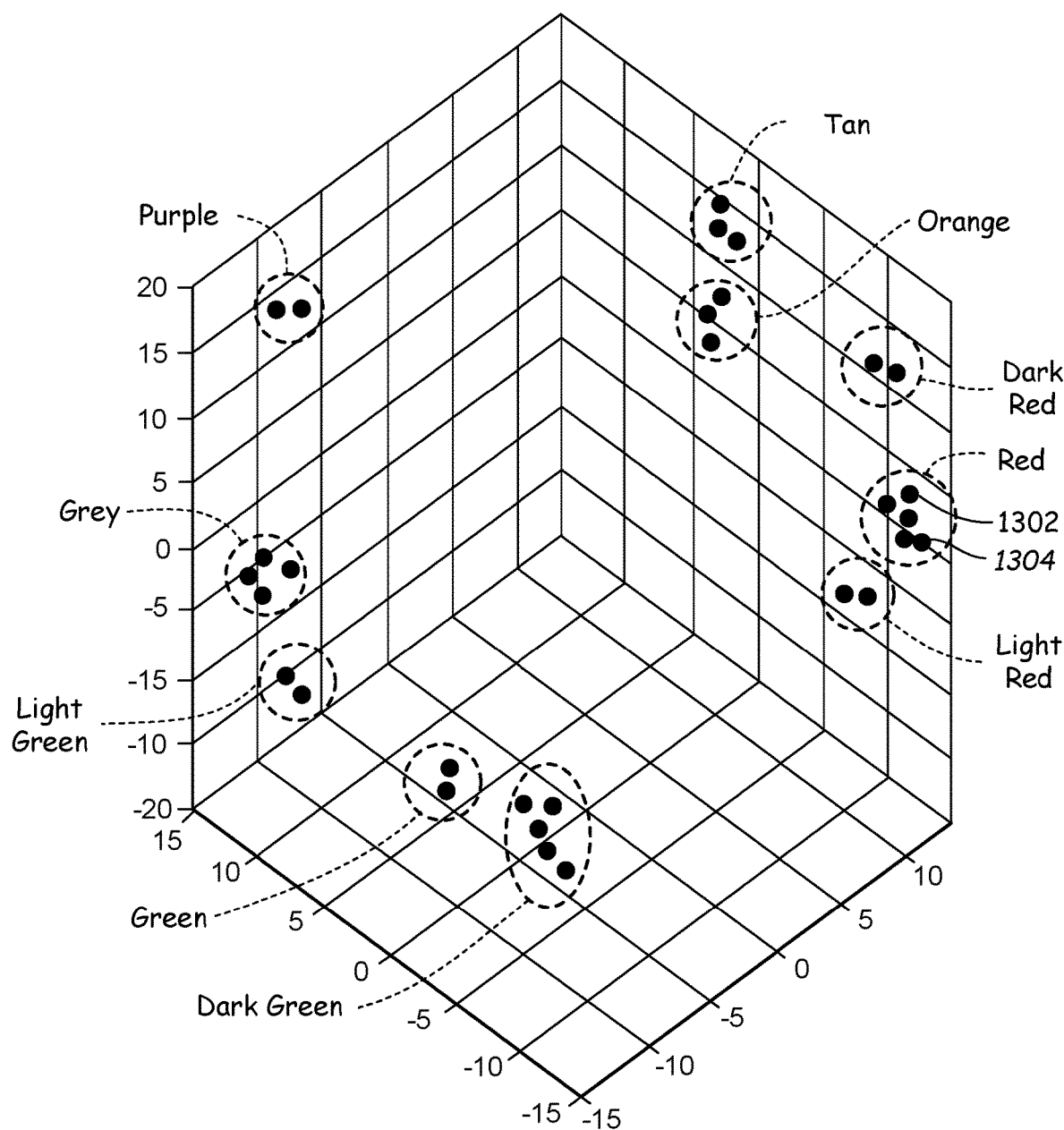
FIG. 13 illustrates an LDA (linear discriminant analysis) plot in HSV color space that tries to rely purely on color (for a set of tube types across various manufacturers) to separate the tube types.

The image cap region (with some buffer) of the cap patch 530 may be extracted and post-processed to remove noise, such as noise stemming from subtracting the images from before. Noise may be removed by morphological operations to account for noise around the mask and connected components (e.g., to account for outlying noise outside the expected mask). At this point in the process, the pixels in the image corresponding to the cap are known. The colors and intensities of the pixels may be extracted and each of these pixels may be converted into a hue-saturation-value (HSV) color space, for example. An example of caps mapped in HSV color space is shown in FIG. 13. Unsupervised clustering may be performed by mapping a 3-dimensional cone (HSV) color space onto a normalized 2-dimensional circle space to extract two colors from the cap.

Figure 6:
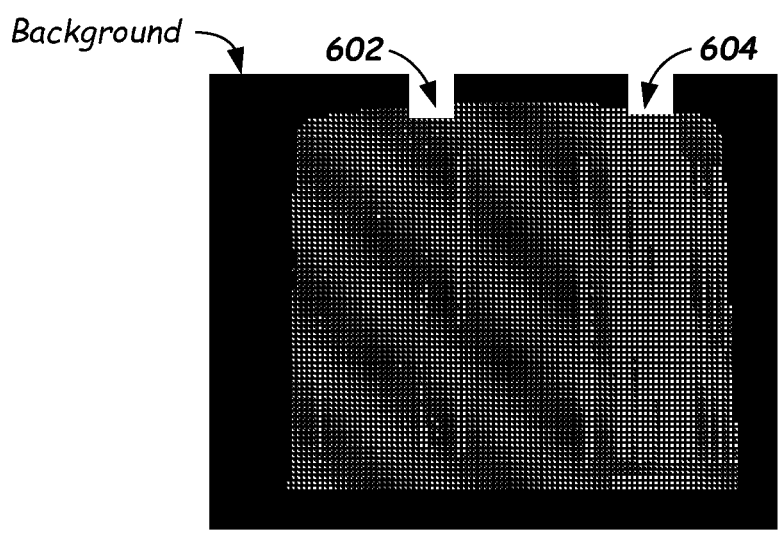
FIG. 6 illustrates regions of an image of a cap used for color extraction and includes color clusters that various pixels fall into, wherein the solid black background refers to a background class including pixels that have their color values from the original image ignored according to one or more embodiments.

FIG. 6 shows example regions of the cap patch 530 from FIG. 5 used for color extraction, and which of the color clusters the pixels fall into. In the embodiment of FIG. 6, the two colors are shown as a light area 604 and a dark area 602, which each may include pixels. The light area 604 may be, for example, blue portions of a cap and the dark area 602 may be, for example, dark blue portions of the second cap 322A. With two colors extracted for the cap patch 530, the distance between the colors on the 2-dimensional circle space is referenced against a difference threshold value to determine whether the distance corresponds with a multi-colored cap, such as the third cap 324A (FIG. 3C) or not. In an embodiment of the third cap 324A, the light area 604 may be, for example, red and the dark area 602 may, for example, be gray. The solid black background may refer to a background class including pixels that have their color values from the portion of the original image ignored.

Figure 7:
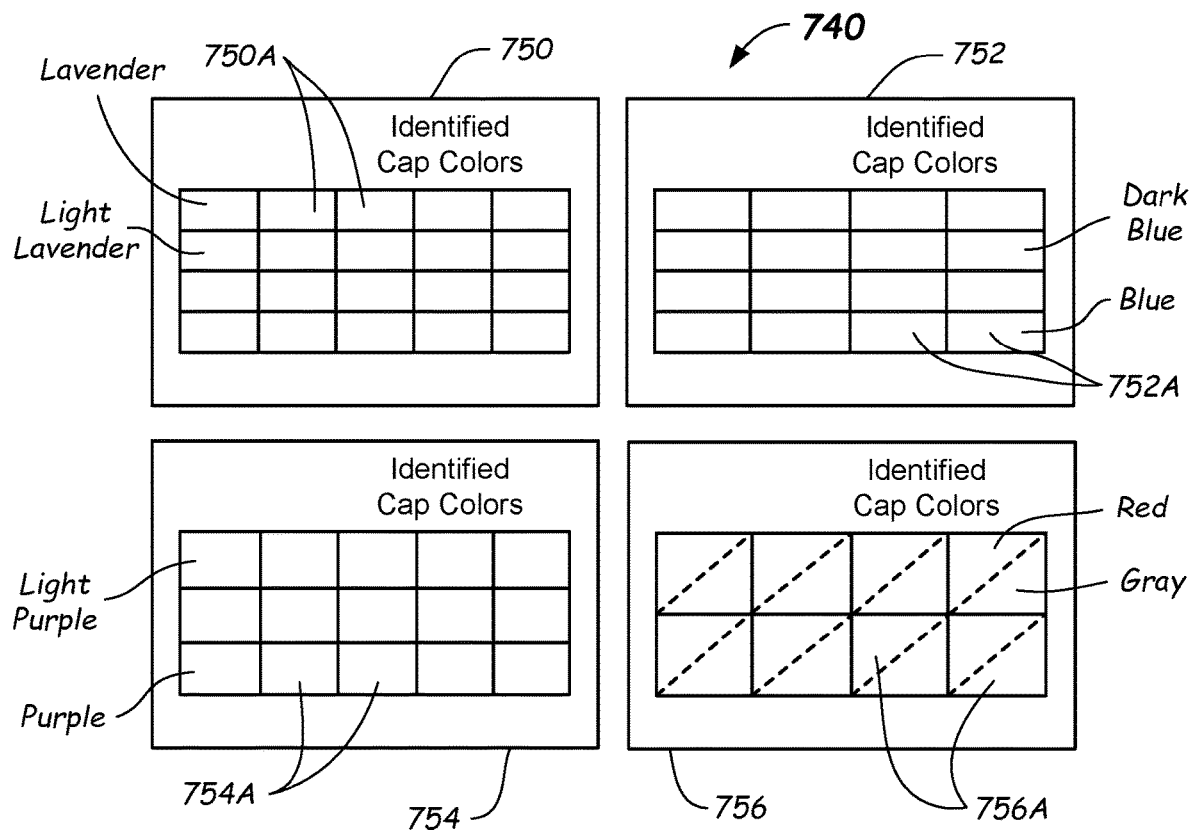
FIG. 7 illustrates colors of caps detected by a diagnostic apparatus and displayed for a user according to one or more embodiments.

The colors detected by the diagnostic apparatus 100 may be displayed for the user. If two colors are detected, such as with a multi-colored cap (e.g., the third cap 324A), both colors, or the mean of each of the two colors, may be displayed. For example, if the colors are close in the 2-dimensional circle space, the mean of both colors may be displayed. An example of a display 740 of cap colors is shown in FIG. 7. A first chart 750 shows a plurality of individual cells 750A that may be colors of first caps imaged by the vision system 107 (FIG. 1). In the embodiment of FIG. 7, the individual cells 750A show variations or different shades of lavender caps imaged by the vision system 107. For example, one or more of the individual cells 750A may show lavender colors imaged by the vision system 107 and one or more other individual cells 750A may show light lavender imaged by the vision system 107. A user of the diagnostic apparatus 100 may verify that the colors shown in the first chart 750 are correct and that their respective tube assembly types are all to be classified as the same tube type.

A second chart 752 shows variations in colors of blue caps, which may be classified as being the same tube type or from single-colored caps. For example, individual cells 752A may show different shades of blue, which the user may confirm all belong to the same tube type. A third chart 754 shows variations in colors of purple caps, which may be classified as being the same tube type or from single-colored cap. For example, individual cells 754A may show different shades of purple, which the user may confirm all belong to the same tube type. A fourth chart 756 shows variations in colors of caps including red colors and gray colors. Individual cells 756A show the two colors imaged by each cap. The caps represented by the fourth chart 756 may be classified as being from multi-colored caps (e.g., third cap 324A—FIG. 3).

The results of the training (e.g., the trained model) may be stored in the memory 122A (FIG. 1), for example. In some embodiments, the results of the training may be in the form of a database described below and may serve several purposes. The database may provide portability so as to enable transferring of the database or the trained model to other diagnostic apparatus. The database may eliminate the need to store the images of the tube assemblies because the features extracted from the images may be stored in the database and can be used for future analysis by a trained model. In some embodiments, in spite of displaying one or two (or more) colors to the user depending on the type of tube assemblies that were imaged, the database may store both the colors (in all cases) for future analysis.

The model may be trained based on physical characteristics of the tube assemblies 102 identified by the images of the tube assemblies 102 and associated image processing described herein. The trained model may include one or more trained classification models such as machine learning models and/or neural networks (e.g., convolutional neural networks—CNNs) that identify and classify tube assemblies by tube type as described herein. Accordingly, training the model may include training a discriminative model, training a neural network, training a convolutional neural network, and/or training a support vector machine, for example. In some embodiments, deep learning may be used to train the model to identify and classify the tube assemblies as described herein.

In some embodiments, the diagnostic apparatus 100 and/or the user may validate the tube type models that have been trained. The diagnostic apparatus 100 and/or the user may also fix conflicts if two different classified tube types are too similar as shown in block 210 of FIG. 2A. The diagnostic apparatus 100 may run a check to make sure that there were not any errors (e.g., one of the tube assemblies is of a different type, one tube had the wrong cap on, etc.) during the training process. In the embodiments described above, since for each tube assembly within a tube type, there may be two color values stored, both of these points in color-space may be compared against other tube assemblies in the tube type to ensure that these points are close enough to one another in color space to constitute the same tube type. For example, the colors may be within a predetermined distance from each other in color-space. An example of such spacing is shown by first cap color 1302 and a second cap color 1304 in FIG. 13. Both the first cap color 1302 and the second cap color 1304 may be classified as being the same tube type or in the same group as described herein.

As described above, with the tube type model(s) trained, the operator can assign the tube types to one or more groups, wherein individual groups may be related to the contents of a tube assembly or a specific function of a tube type as described here and as described in block 208 (FIG. 2A). In some embodiments, the assignment may be performed during training of the model. At least one group may include tube assemblies used during performance of specific tests. For example, following a specific set of standards, a lab may assign the first tube assemblies 320 of the first tube type 202A in the first tray 211A and the second tube assemblies 322 of the second tube type 202B in the second tray 211B into one group (group A) as shown in FIG. 2C. Group A may be defined to contain tube assemblies with a defined function or chemical additive used for specific testing, such as glucose testing. The tube assemblies in group B and group C may be used to perform other functions for specific tests.

With the tightly defined tube type models, a tube type may be grouped (e.g., classified) into a first group, wherein an envelope may be computed that creates a distinct boundary between the tube types in the first group and tube types of other groups. In some embodiments, a user may assign each tray, which may be representative of a tube type, to a group. The group may be a new group or an existing group as described herein. For example, new tube type assemblies may be identified as describe herein and assigned to a new or an existing group.

After the groups are defined, overlap between the groups may be checked. Checking the overlap may ascertain whether tube assemblies with similar colored caps are assigned to different groups (e.g., classifications), which may make it difficult to define a separation boundary between the different groups. For example, a tube type with a red plastic cap and a tube type with a red rubber cap may be assigned to different groups, but the diagnostic apparatus may not be able to distinguish the caps. In embodiments where the tube type definitions are strictly based on colors, the corresponding tube assemblies may have to belong to the same group or else the diagnostic apparatus may achieve unreliable classification results at run-time.

In some embodiments, the diagnostic apparatus 100 or user thereof may fix conflicts if two trained groups are too similar as described in block 210 of FIG. 2A. Otherwise, the diagnostic apparatus 100 may proceed with testing. If model has been successfully trained (i.e. there are no overlaps between groups), the trained model can be ported (copied) to other diagnostic apparatus. A characterization method in another diagnostic apparatus may then use the trained model to classify tube assemblies at run-time (e.g., during testing) as described herein.

Figure 2D:
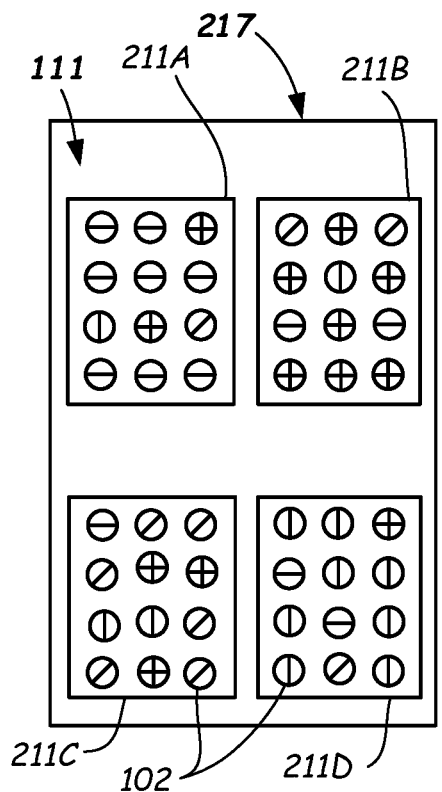
FIG. 2D illustrates tube assemblies located in trays in a diagnostic apparatus for run-time testing according to one or more embodiments.

At run-time, tube assemblies 102 may be loaded randomly in the trays 111, such as shown in FIG. 2D. The diagnostic apparatus 100 may perform a host of functions, such as puck slot occupancy, fluid volume estimation, barcode reading, HILN (hemolysis, icterus, lipemia, and normal determinations), artifact detection (e.g., detection of clot, foam or bubbles), etc. In addition to these functions, the cap and other features, such as those used for training, may be extracted and referenced against all the groups in the trained model. In response, one or more of the tube assemblies 102 may be classified into one of the groups in the database and the corresponding properties/functionality associated with the tube group may applied to the tube assemblies. After the classification, the operator may see the properties of the tube contents displayed on a monitor populate automatically using the prior information in the form of the above-described groups. For example, the tube contents of the tube assemblies in group A (FIG. 2C), groups B, and group C may populate automatically and may be displayed on a monitor 123 (FIG. 1). In some embodiments, an operator is able to verify that a specimen in a tube assembly is assigned to the proper testing by the group or classification of the tube assembly.

The training of the models described herein may complement existing diagnostic apparatus 100. For example, because the training may support a wide variety of tube types, only a few of the tube types may have vision-based grouping conflicts, which may be resolved by other methods described herein. In addition, the training methods described herein may enable operators to quickly train models to identify tube types used in labs, as less manual annotation may be used when training the models.

The models and methods described herein may enable the diagnostic apparatus 100 (FIG. 1) to highlight conflicts with tube types assigned to groups, such as when two similar tube types are assigned to different groups as described above. Furthermore, at run-time, tube assemblies are quickly classified into one of the groups rather than resorting to manual entry into one of the groups. In addition, the groups may be customized by the operator. By grouping the tube types into groups, the operator can be sure that the correct tube types are used for specific tests. For example, the methods and models facilitate discovery of when a wrong tube type is used, by comparing the tube type that is classified at run-time against the one or more tests that are ordered for the specimen in the tube assembly. A database or other comparison method may be used to compare the tube type to the tube type allowed for specific tests, which may be stored in a test menu or the like of a particular analyzer module 118.

In addition to the foregoing, the methods, apparatus, and models disclosed herein may use cap geometry, cap color, and other characteristics of the cap and the tube to distinguish between different tube types. Cap and/or tube features, including color and geometry, may be input into the model, which may be a multi-dimensional discriminative model, such as a linear support vector machine, to identify the tube assemblies. The methods and apparatus may use front and/or back illumination of tube assemblies 102 (FIG. 1) to identify the characteristics of the tube assemblies 102. For example, in some embodiments the one or more light source 110, such as one or more panelized light sources, may illuminate a front surface of a tube assembly and an image of the reflected light may be captured. In other embodiments, one or more light sources 110, such as panelized light sources, may back illuminate a tube assembly and an imaging device may capture an image of the light passing through the tube assembly. However, front illumination may provide improved discrimination of at least color.

In some embodiments, further processing of the image in an area identified as a cap may, using a color determining algorithm, extract or identify a color of the cap. The further processing may be used to train the model and/or used by the model to classify the tube assemblies 102 (FIG. 1). As described above, the algorithm may determine colors of multi-colored caps (e.g., third cap 324A—FIG. 3C). In these embodiments, color values for each of the pixels representing the cap may be identified. The mean of the color values (mean color) of all or a patch of the pixels may be determined, such as by using the computer algorithm. The color components of the mean color may then be determined and used to train the model and/or used by the model to classify tube assemblies 102.

In some embodiments, the mean color may be computed in HSV (hue, saturation, value) color space to yield color hue, saturation, and value components. An example of tube assemblies mapped in HSV color space is provided in FIG. 13. These color components provide three dimensions or vectors that may be input to the model (e.g., a discriminative model) to help clearly classify the tube types. Other color characterizing methods may be used, such as using HSL, RGB (red, green, blue), Adobe RGB, YIQ, YUV, CIELCAB, CIELUV, ProPhoto, sRGB, Luma plus Chroma, CMYK, or the like.

In some embodiments, features related to cap geometry may be input to the model. For example, geometric features related to a dimension gradient (e.g., row gradients and/or column gradients indicating a rate of change of dimension) may be input to the model. An algorithm may scan (e.g., raster scan) the image of the cap from top to bottom or from bottom to top, for example, to determine the width of the cap as a function of vertical position (e.g., along a y-axis), wherein the widths are calculated along a horizontal axis or x-axis. For example, the algorithm may scan the masked image of the cap from top to bottom, analyze the shape of the cap, and store both the absolute values of the widths and the first-order numerical derivative along the y-axis of the image of the cap. The first order numerical derivative may be calculated by equation (1) as follows, which is for a single axis:

$$\frac{\delta \mu_{i,j}}{\delta y} = \frac{\mu_{(i,j+1)} - \mu_{(i,j-1)}}{2 \Delta y} \qquad \text{Equation (1)}$$

Equation (1) yields the row gradients. The maximum value of the row gradient, referred to as RG-max, may be calculated. The value of RG-max is a function of and related to a sharpest change in the width of the cap and may be a vector input to the model. In other embodiments, other geometric features of the cap may be analyzed and input into the model. For example, contours along a top surface of the cap may be analyzed and input to the model. In other embodiments, gradients of cap height may be analyzed and input to the model.

In some embodiments, the material of the cap may be analyzed to obtain one or more other differentiating characteristics that may be input to the model. Analyzing the cap material may include computing a measure of the opacity of the cap. For example, an algorithm may use back-illuminated images of the cap at high exposure times across multiple spectra (wavelength) of light and may analyze the results. In some embodiments, the three visible light spectrums (RGB) may be used. For example, back-illuminated red-channel images may be exposed for about 10309 μs, back-illuminated green-channel images may be exposed for about 20615 μs, and back-illuminated blue-channel images may be exposed for about 10310 μs. Statistics for each of the color channels may be computed and input into the model during training. For example, the mean value of the high-exposure image of each wavelength of RGB may be computed. With these three mean values (R-mean, G-mean and B-mean), the model may use a multi-dimensional (7-dimensional) discriminative feature space (H, S, V, RG-max, R-mean, G-mean, B-mean) for cap identification and/or classification.

In an n-dimensional feature space (n=7 in this embodiment), a model (e.g., a discriminative model or a discriminator) can be trained to properly identify the tube type. An example of a model, such as a discriminator, is a linear support vector machine (SVM), which draws decision hyper-boundaries around each cap and/or tube type in high dimensional feature space. The cap and/or tube type may then be identified. In some embodiments, more features, such as cap height, diameter, or other vision-based features may be included as additional dimensions in the model. Cap weight may be utilized also, such as at a de-capping station after the imaging stage. In other embodiments, other back-illuminated or non-visible light (e.g., IR or near IR) may be used to add more powerful models to leverage the dimensional complexity of the color space.

The models and algorithms described herein may associate specific caps with their appropriate tube types without relying solely on the colors of the cap. The models and algorithms may perform these tasks without input from operators, i.e., discrimination can be automated. The following description provides an example of implementing the above-described methods and apparatus to distinguish tube types based on caps attached to the tubes. In other embodiments, characteristics of the tube assemblies may be analyzed and the models and algorithms may determine tube types based on the analysis.

Referring again to FIGS. 3A-3D, the first cap 320A may have a first color and the second cap 322A may have a second color. In some embodiments, the first color may be similar to the second color such that a color-only computer algorithm may not be able to distinguish the first color from the second color. In other embodiments, the first color may be different than the second color. The methods and apparatus described herein may analyze the above-described features and colors to distinguish the first cap 320A from the second cap 322A and thus the tube type of the first tube assembly 320 from the tube type of the second tube assembly 322.

Figures 8A, 8B:
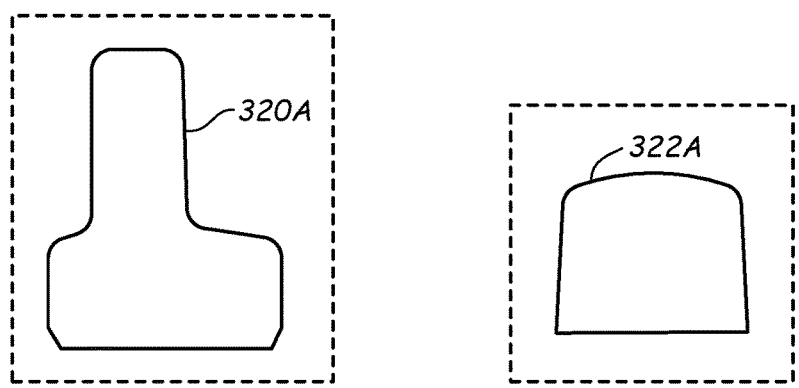
FIG. 8A is a schematic diagram of a mask image of a first cap of a first tube including a box indicating the location of where the mask image aligns with the first tube assembly of FIG. 3A according to one or more embodiments.
FIG. 8B is a schematic diagram of a mask image of a second cap of a second tube including a box indicating the location of where the mask image aligns with the second tube assembly of FIG. 3B according to one or more embodiments.

One or more images of the first tube assembly 320 and the second tube assembly 322 may be captured by the one or more imaging devices 106 (FIG. 1). The images may be pixilated images made up of pixels, wherein each image includes a plurality of pixels. Additional reference is made to FIGS. 8A and 8B, wherein FIG. 8A illustrates a schematic diagram of a mask image of the first cap 320A removed from the first tube 320B and FIG. 8B illustrates a schematic diagram of a mask image of the second cap 322A removed from the second tube 322B. In some embodiments, algorithms executing on the controller 122 may classify the pixels in the images as being the caps and may isolate those pixels for additional processing. The boxes around FIGS. 8A and 8B indicate where the mask images align with the first tube assembly 320 of FIG. 3A and the second tube assembly 322 of FIG. 3B, which include like boxes.

The pixel locations in the image of FIG. 8A may be used to analyze the original color image to determine a color of the first cap 320A. Determining the color of the first cap 320A may be performed by calculating the mean color of the pixels, median color of the pixels, a mode value of the pixels, or other color values of the pixels. More advanced un-supervised machine learning methods such as k-means clustering may also be used to create color clusters. The mean color may be computed in HSV color space to generate three color feature dimensions of the HSV color model (H-Hue, S-Saturation, and V-Value (brightness)) for input to the model of the first tube assembly 320. The same process may be applied to the pixel locations in FIG. 8B to generate three color feature dimensions for input to the model of the second tube assembly 322.

Additional dimensions for input to the model may be obtained by analyzing geometric features of the first tube assembly including the first cap 320A and/or the first tube 320B and the second tube assembly 322 including the second cap 322A and/or the second tube 322B. Algorithms executing on the controller 122 may analyze dimension gradients, such as row gradients of the first cap 320A and may include portions of the first tube 320B. Likewise, the algorithms may analyze dimension gradients, such row gradients of the second cap 322A and may include portions of the second tube 322B.

Figure 9A:
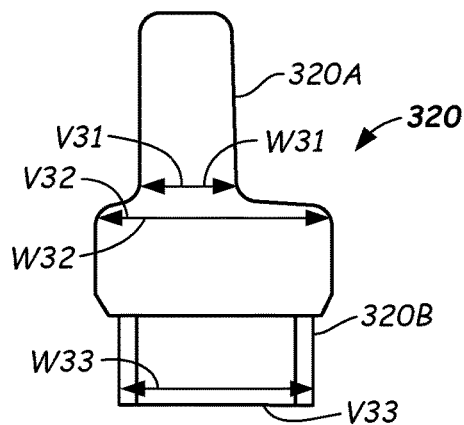
FIG. 9A illustrates portions of a first tube assembly including a cap that may be analyzed to determine row gradients according to one or more embodiments.
Figure 10A:
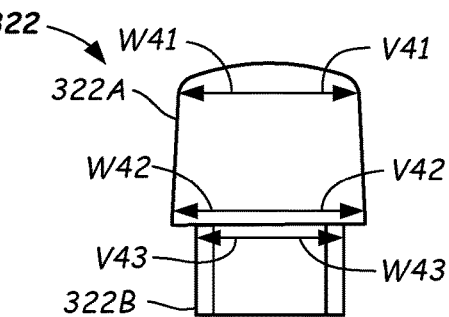
FIG. 10A illustrates portions of a second tube assembly including a cap that may be analyzed to determine row gradients according to one or more embodiments.

Reference is made to FIG. 9A, which illustrates portions of the first tube assembly 320 that may be analyzed to determine geometrical gradients, such as row gradients. Reference is also made to FIG. 10A, which illustrates portions of the second tube assembly 322 that may be analyzed to determine geometrical gradients, such as row gradients. Referring to FIG. 9A, the algorithm may scan the first cap 320A and a portion of the first tube 320B from top to bottom to determine numerical values indicative of the shape of the first cap 320A and a portion of the first tube 320B. In the embodiment of FIG. 3A, the numerical values are various widths of the first cap 320A and a top portion of the first tube 320B.

Figure 9B:
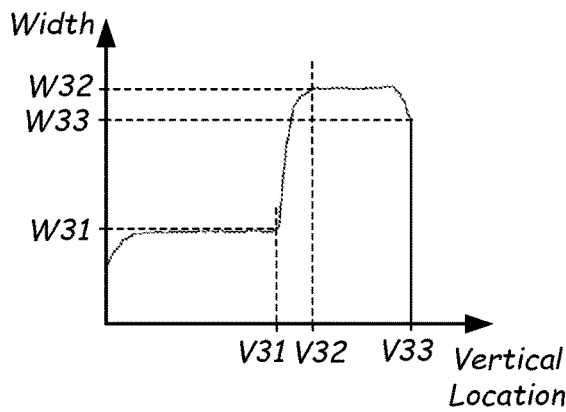
FIG. 9B graphically illustrates the width as a function of vertical location of the first tube assembly shown in FIG. 9A according to one or more embodiments.

Additional reference is made to FIG. 9B, which graphically illustrates the various width dimensions as a function of vertical dimension along the first tube assembly 320 shown in FIG. 9A. As shown in FIGS. 9A and 9B, the first tube assembly 320 has a width W31 at a vertical location V31 and a width W32 at a vertical location V32. The first tube assembly 320 has a width W33 at a vertical location V33, which is the width of the first tube 320B. These widths may represent unique geometric properties of the first tube assembly 320 in terms of width as a function of vertical location.

Figure 9C:
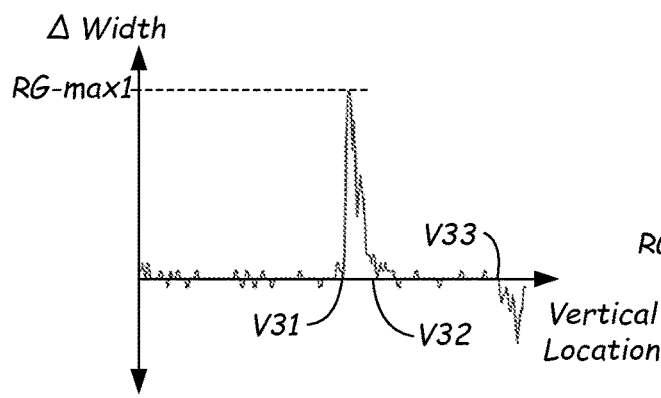
FIG. 9C graphically illustrates a first order derivative of the plot of the first tube assembly as plotted on the graph of FIG. 9B.
Figure 10C:
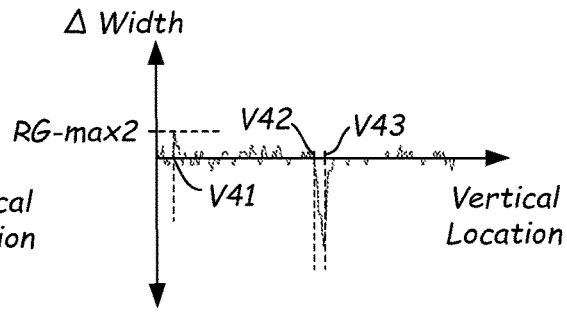
FIG. 10C graphically illustrates a first order derivative of the plot of the second tube assembly as plotted on the graph of FIG. 10B according to one or more embodiments.

Additional reference is made to FIG. 9C, which illustrates the first order derivative of the dimensional plot of FIG. 9B (width dimension vs. vertical dimension) of first tube assembly 320. Equation (1) may be applied to the graph of FIG. 9B to yield the graph of FIG. 9C. It is noted that the topmost rows of the first cap 320A may be ignored during processing, so the first order derivative does not approach infinity when equation (1) is applied to the topmost row of pixels. The y-axis of the graph of FIG. 9C is referred to as ΔWidth. A maximum value of ΔWidth, referred to as RG-max1, is shown on the graph of FIG. 9C and may be input into the model of the first tube assembly 320 as another model input.

Figure 10B:
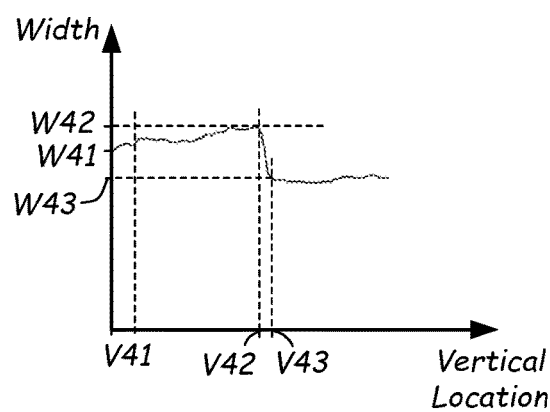
FIG. 10B graphically illustrates the width as a function of vertical location of the second tube assembly shown in FIG. 10A according to one or more embodiments.

Additional reference is made to FIG. 10B, which graphically illustrates the various widths of the second tube assembly 322 shown in FIG. 10A as a function of vertical dimension (location). As shown in FIGS. 10A and 10B, the second tube assembly 322 has a width W41 at a vertical location V41 and a width W42 at a vertical location V42. The second tube assembly 322 has a width W43 at a vertical location V43, which is the width of the second tube 322B. These widths represent unique geometric properties of the second tube assembly 322.

Additional reference is made to FIG. 10O, which illustrates the first order derivative of the second tube assembly 322 as plotted on the graph of FIG. 10B. Equation (1) may be applied to the graph of FIG. 10B to yield the graph of FIG. 10O. It is noted that the topmost rows of the second cap 322A may be ignored during processing, so the first order derivative does not approach infinity when the derivative of the first rows are calculated. The y-axis of the graph of FIG. 10O is referred to as ΔWidth. A value of maximum peak value of ΔWidth, referred to as RG-max2, is shown on the graph of FIG. 10O and may be input into the model of the second tube assembly 322 as another model input. Thus, the gradients of the first tube assembly 320 and the second tube assembly 322 may be used to identify and/or distinguish the tube assemblies irrespective of the colors of the first cap 320A and the second cap 322A. In some embodiments, the minimum values of ΔWidth may be used to identify and/or distinguish the tube assemblies.

Another differentiating characteristic in the first tube assembly 320 and the second tube assembly 322 may be the cap material and/or the tube material, which may be determined by computing a measure of opacity. To measure this characteristic, portions of the tube assemblies, including the caps, may be back illuminated and images of the tube assemblies may be captured at high exposure times, and may also be across multiple light spectra. In some embodiments, the three visible light spectra (red (R), green (G), and blue (B)) may back-illuminate the first tube assembly 320 and the second tube assembly 322.

Reference is made to FIG. 11A, which illustrates a graph of example light spectra passing through the first tube assembly 320 and captured by the one or more imaging devices 106. Reference is also made to FIG. 11B, which illustrates a graph of example light spectra passing through the second tube assembly 322 and captured by the one or more imaging devices 106. The graphs of FIGS. 11A and 11B are graphed on an intensity scale from 0 to 255, wherein 0 is no received light and 255 represents no light being blocked by a tube assembly. The portion of the first tube assembly 320 represented by the graph of FIG. 11A is shown in FIG. 9A and the portion of the second tube assembly 322 represented by the graph of FIG. 11B is shown in FIG. 10A. In some embodiments, the back-illuminated red-channel images may be exposed for about 103091 μs, the back-illuminated green-channel images may be exposed for about 206151 μs, and the back-illuminated blue-channel images may be exposed for about 103101 μs.

Additional reference is made to FIG. 11C, which illustrates photographic images of a portion the first tube assembly 320. The top photographic image is a portion of the first tube assembly 320 captured with foreground illumination in a full RGB color spectrum. The second image is a monochromatic photographic image of a portion of the first tube assembly 320 captured with red background illumination. The third image is a monochromatic photographic image of a portion of the first tube assembly 320 captured with green background illumination. The fourth image is a monochromatic photographic image of a portion of the first tube assembly 320 captured with blue background illumination.

Additional reference is also made to FIG. 11D, which illustrates photographic images of a portion the second tube assembly 322. The top photographic image is a portion of the second tube assembly 322 captured with foreground illumination in a full RGB color spectrum. The second image is a monochromatic photographic image of a portion of the second tube assembly 322 captured with red background illumination. The third image is a monochromatic photographic image of a portion of the second tube assembly 322 captured with green background illumination. The fourth image is a monochromatic photographic image of a portion of the second tube assembly 322 captured with blue background illumination.

From the graphs of FIGS. 11A and 11B, it is shown that the first tube assembly 320 has almost full opacity in any of the wavelengths (R, G, B) and the second tube assembly 322 blocks a large amount of light at all three wavelengths. In some embodiments, a mean value for each wavelength of the high-exposure images is calculated and is respectively referred to as R-mean, G-mean, and B-mean. In some embodiments, a median value for each wavelength of the high-exposure images is calculated.

When all the above-described dimensions are calculated, there can be a 7-dimensional discriminative feature space (H, S, V, RG-max, R-mean, G-mean, B-mean) for each tube assembly. In an n-dimensional feature space (n=7 in this embodiment), the model can be trained to properly identify various tube types. An example of such a model (e.g., a discriminator or discriminative model) is a linear SVM, which draws decision hyper-boundaries around each tube type in this high dimensional feature space. Based on the foregoing model, the first tube assembly 320 may be distinguished from the second tube assembly 322, even if the first cap 320A and the second cap 322A have the same or similar colors. With more features, such as cap opacity, cap weight, cap vertical height, diameter, or other vision-based geometrical features, or additional image types, such as different back illumination or illumination using non-visible light (e.g., IR or near IR), an even more powerful discriminatory model may be used to leverage the dimensional complexity of the space.

The apparatus and methods described herein enable diagnostic labs and the above-described algorithms to differentiate many different tube types that may pass through the labs. Solely relying on the colors of the cap could lead to unreliable results because of the different manufacturer and/or region-specific standards. Based on the foregoing, the apparatus and methods disclosed herein improve discrimination of and help distinguish between various tube types when cap color itself is not enough to distinguish between the various tube types. This is advantageous because it enables a diagnostic device or machine to determine the tube type (and hence, corresponding features) from one or more sensors located within the diagnostic device or machine without requiring any manual input from the operator. The technical features that contribute to the advantages of the apparatus and the methods described herein can include a high-dimensional feature vector for each tube type using data collected from one or more on-board sensors and a discriminative model in high-dimensional space to properly determine the tube type. Use of such a high-dimensional model may speed up the sample processing workflow and can correctly identifies mismatch between an assay ordered for a tube and its chemical additive or geometrical properties.

Figure 14:
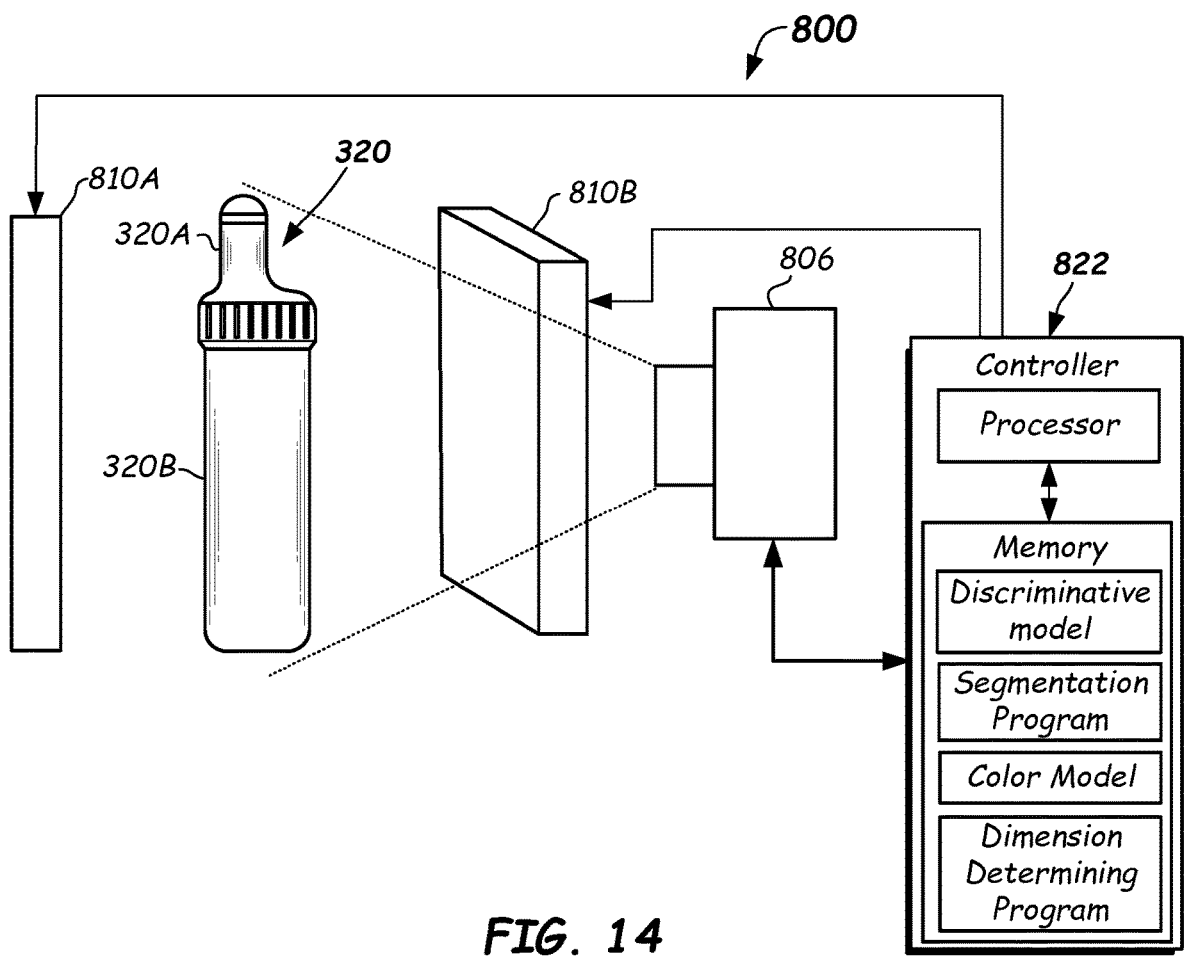
FIG. 14 illustrates a schematic diagram of a diagnostic apparatus adapted to image and discriminate tube types according to one or more embodiments.

FIG. 14 illustrates an imaging system 800 that is configured to capture one or more images of the first tube assembly 320 made up of the first cap 320A and the first tube 320B, wherein the one or more images may be pixilated images made up of pixels, wherein each image includes a plurality of pixels. The imaging system 800 may be used in the vision system 107 (FIG. 1). The imaging system 800 includes a front light source 810B, such as light panel, which may be a light source 110 (FIG. 1). In some embodiments, more than one front light source may be used, such as light panels positioned at either lateral side of an imaging device 806. In some embodiments, one or more back light sources 810A may be provided, such as one or more light panels to provide back light for determining opacity, for example. Other arrangements are possible.

The imaging system 800 may further include a controller 822 communicatively coupled to the image device 806 and the light sources 810A, 810B. The controller 822 may be the same as the controller 122 (FIG. 1) and may be any suitable computer including a processor and a memory suitable to store and execute executable program instructions, such as in the form of a model as described herein. The controller 822 may send signals to the light sources 810A, 810B at appropriate times to provide front lighting and/or back lighting. The controller 822 may receive image data generated by the imaging device 806 and process the image data as described herein to train the model and/or classify and/or identify tube assemblies 102 (FIG. 1).

Figure 15:
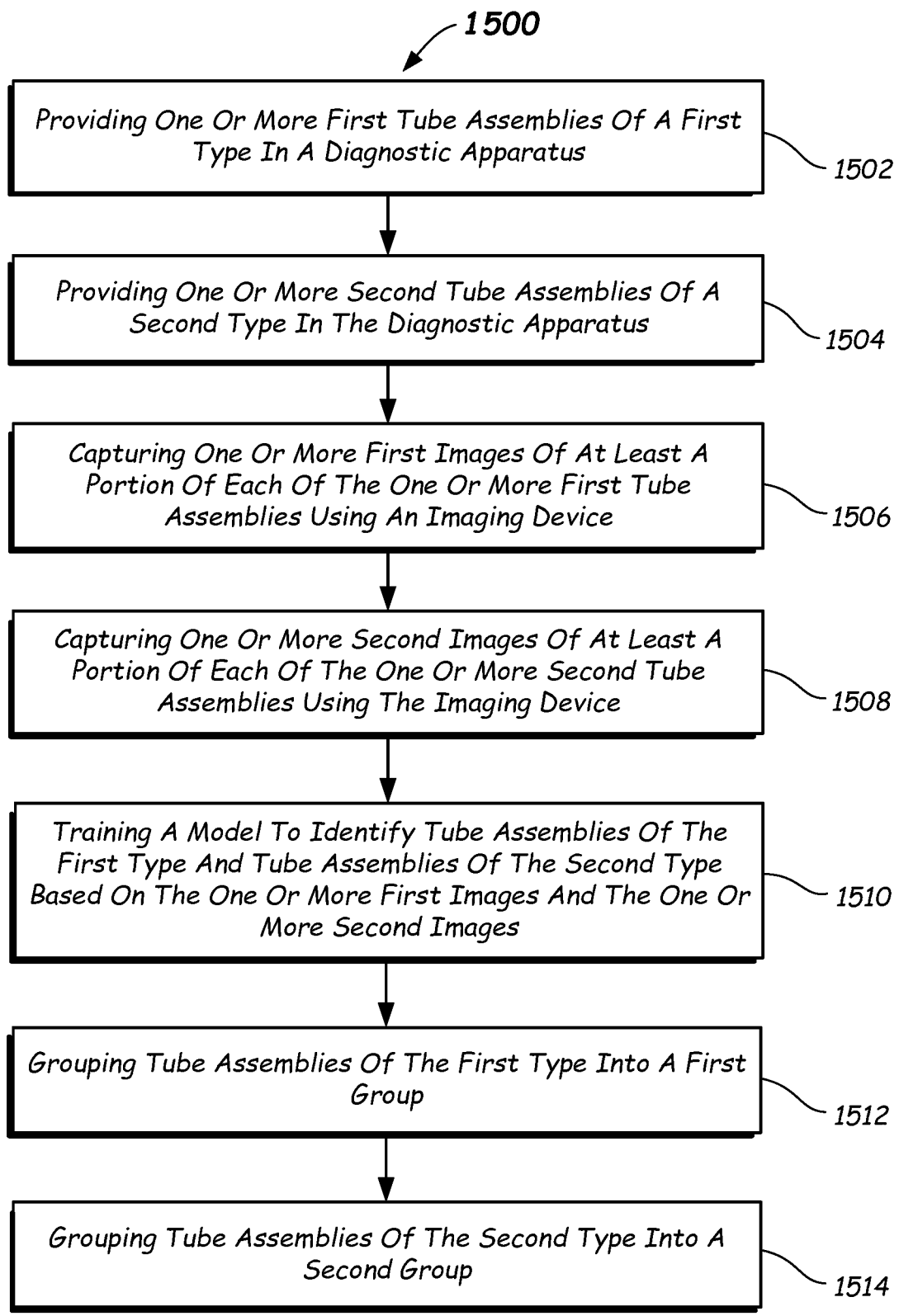
FIG. 15 illustrates a flowchart showing a method of training a model of a diagnostic apparatus according to one or more embodiments.

Reference is now made to FIG. 15, which illustrates a method 1500 of training a model of a diagnostic apparatus (e.g., diagnostic apparatus 100). The method 1500 includes, in 1502, providing one or more first tube assemblies (e.g., first tube assemblies 320) of a first type (e.g., first type 202A) in a diagnostic apparatus. The method 1500 includes, in 1504, providing one or more second tube assemblies (e.g., second tube assemblies 322) of a second type (e.g., second type 202B) in the diagnostic apparatus. The method includes, in 1506, capturing one or more first images of at least a portion of each of the one or more first tube assemblies using an imaging device (e.g., imaging device 106). The method 1500 includes, in 1508, capturing one or more second images of at least a portion of each of the one or more second tube assemblies using the imaging device. The method 1500 includes, in 1510, training a model to identify tube assemblies of the first type and tube assemblies of the second type based on the one or more first images and the one or more second images. The method 1500 includes, in 1512, grouping tube assemblies of the first type into a first group. The method 1500 includes, in 1514, grouping tube assemblies of the second type into a second group.

Figure 16:
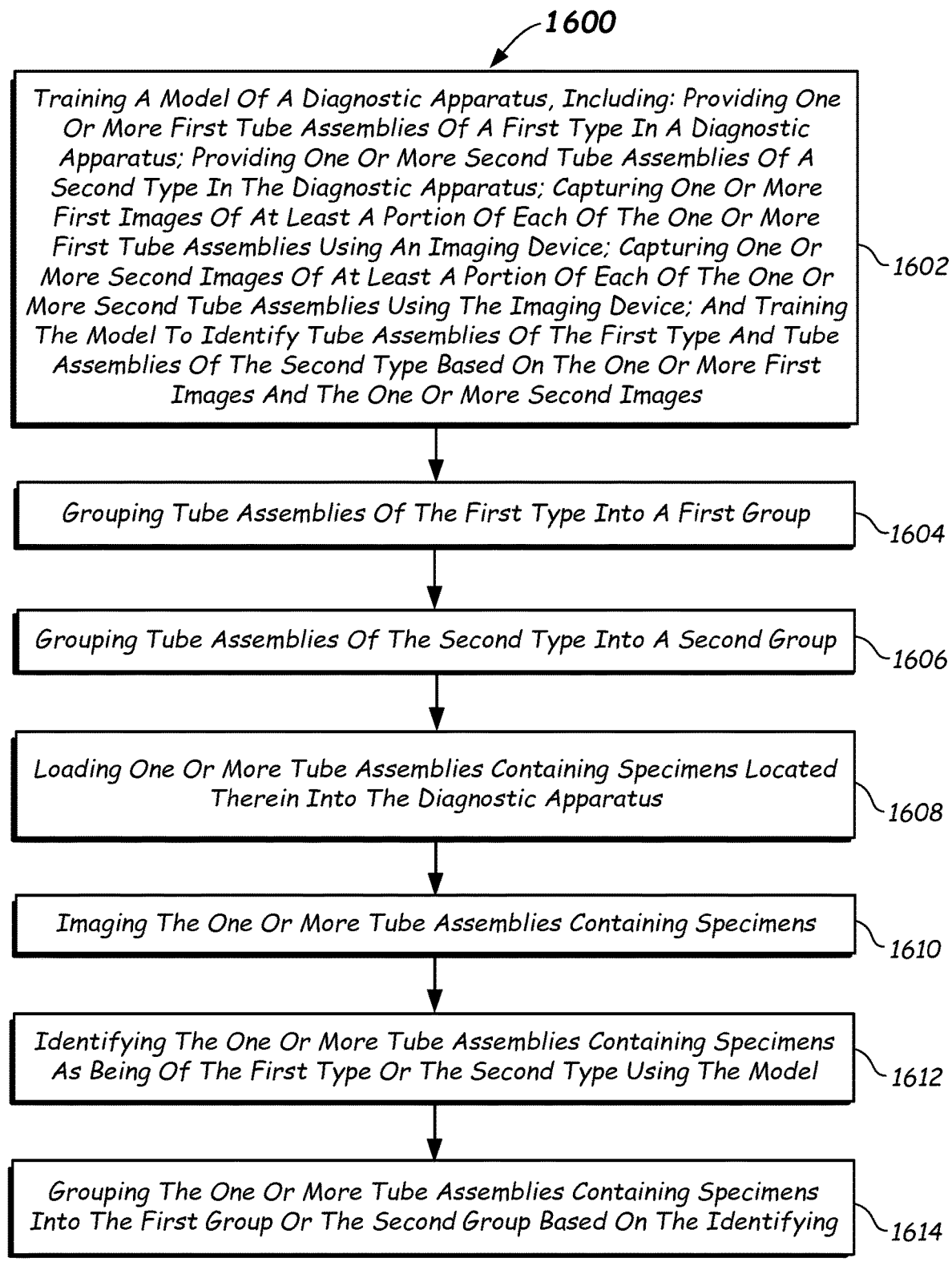
FIG. 16 illustrates a flowchart showing a method of operating a diagnostic apparatus according to one or more embodiments.

Reference is made to FIG. 16, which illustrates a method 1600 of operating a diagnostic apparatus (e.g., diagnostic apparatus 100). The method 1600 includes, in 1602, training a model of a diagnostic apparatus, including: providing one or more first tube assemblies (e.g., first tube assemblies 320) of a first type (e.g., first type 202A) in a diagnostic apparatus; providing one or more second tube assemblies (e.g., second tube assemblies 322) of a second type (e.g., second type 202B) in the diagnostic apparatus; capturing one or more first images of at least a portion of each of the one or more first tube assemblies using an imaging device (e.g., imaging device 106); capturing one or more second images of at least a portion of each of the one or more second tube assemblies using the imaging device; and training the model to identify tube assemblies of the first type and tube assemblies of the second type based on the one or more first images and the one or more second images. The method 1600 includes, in 1604, grouping tube assemblies of the first type into a first group. The method 1600 includes, in 1606, grouping tube assemblies of the second type into a second group. The method 1600 includes, in 1608, loading one or more tube assemblies containing specimens located therein into the diagnostic apparatus. The method 1600 includes, in 1610, imaging the one or more tube assemblies containing specimens. The method 1600 includes, in 1612, identifying the one or more tube assemblies containing specimens as being of the first type or the second type using the model. The method 1600 includes, in 1614, grouping the one or more tube assemblies containing specimens into the first group or the second group based on the identifying.

While the disclosure is susceptible to various modifications and alternative forms, specific system and apparatus embodiments and methods thereof have been shown by way of example in the drawings and are described in detail herein. It should be understood, however, that it is not intended to limit the disclosure to the particular apparatus or methods disclosed but, to the contrary, the intention is to cover all modifications, equivalents, and alternatives falling within the scope of the disclosure.

What is claimed is:

1. A method of training a model of a diagnostic apparatus, comprising:
providing one or more first tube assemblies of a first type in a diagnostic apparatus;
providing one or more second tube assemblies of a second type in the diagnostic apparatus;
capturing one or more first images of at least a portion of each of the one or more first tube assemblies using an imaging device;
capturing one or more second images of at least a portion of each of the one or more second tube assemblies using the imaging device;
training a model to identify tube assemblies of the first type and tube assemblies of the second type based on one or more physical characteristics of a tube assembly identified in the one or more first images and the one or more second images;
grouping tube assemblies of the first type into a first group by the trained model, the first group associated with first tests to be performed by the diagnostic apparatus or a first chemical additive or contents in the first type; and
grouping tube assemblies of the second type into a second group by the trained model, the second group associated with second tests to be performed by the diagnostic apparatus or a second chemical additive or contents in the second type.

2. The method of claim 1, further comprising:
transporting the one or more first tube assemblies to the imaging device located in the diagnostic apparatus; and
transporting the one or more second tube assemblies to the imaging device.

3. The method of claim 1, wherein providing the first tube assemblies and providing the second tube assemblies comprises locating the one or more first tubes assemblies of the first type in a first container and locating the one or more second tube assemblies of the second type in a second container.

4. The method of claim 1, comprising:
providing one or more third tube assemblies of a third type in the diagnostic apparatus; and
capturing one or more third images of at least a portion of each of the one or more third tube assemblies using the imaging device,
wherein training the model comprises training the model to identify tube assemblies of the third type based on the one or more third images, and
further comprising grouping tube assemblies of the third type into a third group.

5. The method of claim 4, comprising grouping tube assemblies of the first type and tube assemblies of the third type in the first group and tube assemblies of the second type in the second group.

6. The method of claim 1, wherein training the model comprises training a discriminative model.

7. The method of claim 1, wherein training the model comprises training a neural network.

8. The method of claim 1, wherein training the model comprises training a convolutional neural network.

9. The method of claim 1, wherein training the model comprises training a support vector machine.

10. The method of claim 1, wherein training the model comprises analyzing the one or more first images to identify at least one color, geometric, material, or dimensional-gradient characteristic of the one or more first tube assemblies and analyzing the one or more second images to identify at least one color, geometric, material, or dimensional-gradient characteristic of the one or more second tube assemblies.

11. The method of claim 10, wherein the one or more first tube assemblies comprise a cap and wherein the at least one characteristic is a color of the cap.

12. The method of claim 11, further comprising displaying images of at least one color of a cap of the one or more first tube assemblies.

13. The method of claim 10, wherein the one or more first tube assemblies comprise a cap and wherein the at least one characteristic is a geometric feature of the cap.

14. The method of claim 10, wherein the one or more first tube assemblies comprise a cap and wherein the at least one characteristic is opacity of the cap.

15. The method of claim 14, wherein the at least one characteristic is opacity of at least one wavelength of light.

16. The method of claim 1, wherein training the model generates a trained model, and further comprising transporting the trained model to another diagnostic apparatus.

17. The method of claim 1, wherein tube assemblies in the first group are used for a first analysis of biological samples and tube assemblies in the second group are used for a second analysis of biological samples.

18. A method of operating a diagnostic apparatus, comprising:
- training a model of the diagnostic apparatus, comprising:
  - providing one or more first tube assemblies of a first type in a diagnostic apparatus;
  - providing one or more second tube assemblies of a second type in the diagnostic apparatus;
  - capturing one or more first images of at least a portion of each of the one or more first tube assemblies using an imaging device;
  - capturing one or more second images of at least a portion of each of the one or more second tube assemblies using the imaging device; and
  - training the model to identify tube assemblies of the first type and tube assemblies of the second type based on one or more physical characteristics of a tube assembly identified in the one or more first images and the one or more second images;
- grouping tube assemblies of the first type into a first group by the trained model, the first group associated with first tests to be performed by the diagnostic apparatus or a first chemical additive or contents in the first type;
- grouping tube assemblies of the second type into a second group by the trained model, the second group associated with second tests to be performed by the diagnostic apparatus or a second chemical additive or contents in the second type;
- loading one or more tube assemblies containing specimens located therein into the diagnostic apparatus;
- imaging the one or more tube assemblies containing specimens;
- identifying the one or more tube assemblies containing specimens as being of the first type or the second type using the model; and
- grouping the one or more tube assemblies containing specimens into the first group or the second group based on the identifying.

19. The method of claim 18, wherein training the model comprises analyzing the one or more first images to identify at least one color, geometric, material, or dimensional-gradient characteristic of the one or more first tube assemblies and analyzing the one or more second images to identify at least one color, geometric, material, or dimensional-gradient characteristic of the one or more second tube assemblies.

20. A diagnostic apparatus, comprising:
- a location configured to store one or more first tube assemblies of a first type and one or more second tube assemblies of a second type;
- an imaging device configured to image at least a portion of the one or more first tube assemblies and at least a portion of the one or more second tube assemblies;
- a transport device configured to transport the one or more first tube assemblies and the one or more second tube assemblies at least to the imaging device; and
- a controller including a processor coupled to a memory, the memory having instructions stored therein that, when executed by the processor:
  - train a model to identify tube assemblies of the first type and tube assemblies of the second type based on one or more physical characteristics of a tube assembly identified in at least one image of the at least a portion of the one or more first tube assemblies and at least one image of the at least a portion of the one or more second tube assemblies; and
  - group tube assemblies of the first type in a first group and tube assemblies of the second type in a second group, wherein:
    - the first group is associated with first tests to be performed by the diagnostic apparatus or a first chemical additive or contents in the first type; and
    - the second group is associated with second tests to be performed by the diagnostic apparatus or a second chemical additive or contents in the second type.

* * * * *